(12) United States Patent
Yang

(10) Patent No.: US 10,106,005 B2
(45) Date of Patent: Oct. 23, 2018

(54) CARRIER DEVICE CAPABLE OF VARYING CONTACT DAMPING WITH PRESSURED DISPLACEMENT

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 0 days.

(21) Appl. No.: 15/159,962

(22) Filed: May 20, 2016

(65) Prior Publication Data

US 2017/0334258 A1    Nov. 23, 2017

(51) Int. Cl.
*B60G 3/01*    (2006.01)
*A47B 91/16*    (2006.01)
*B60B 33/00*    (2006.01)

(52) U.S. Cl.
CPC ............... *B60G 3/01* (2013.01); *A47B 91/16* (2013.01); *B60B 33/00* (2013.01); *B60G 2202/12* (2013.01); *B60G 2202/15* (2013.01); *B60G 2202/16* (2013.01); *B60G 2800/164* (2013.01)

(58) Field of Classification Search
CPC .. B60G 3/01; B60G 2202/12; B60G 2202/15; B60G 2202/16; B60G 2800/164
See application file for complete search history.

(56) References Cited

U.S. PATENT DOCUMENTS

| | | | | |
|---|---|---|---|---|
| 5,248,011 A | * | 9/1993 | Richards | B60G 3/01 180/215 |
| 2012/0098221 A1 | * | 4/2012 | Michel | B60G 3/01 280/86.751 |
| 2013/0056288 A1 | * | 3/2013 | Gano | B60G 3/01 180/23 |
| 2014/0379227 A1 | * | 12/2014 | Reuter | E01C 23/088 701/50 |
| 2015/0027801 A1 | * | 1/2015 | Amino | B62D 5/0418 180/446 |
| 2015/0027830 A1 | * | 1/2015 | Yoshimoto | B62K 25/08 188/314 |
| 2015/0102568 A1 | * | 4/2015 | Slawson | B60G 17/005 280/5.514 |
| 2015/0251719 A1 | * | 9/2015 | Takano | B60G 3/01 280/267 |

* cited by examiner

*Primary Examiner* — Drew J Brown
(74) *Attorney, Agent, or Firm* — Bacon & Thomas, PLLC

(57) ABSTRACT

The present invention provides one or more carrier devices capable of varying contact damping with pressured displacement. The device is configured to be installed on mechanical force-receiving structures that have rolling wheels, rolling balls or slidably displaceable terminal block structure, carrying devices and transportation devices for humans or objects. When receiving pressure smaller than a set value, the device provides low contact damping and is thus easy to move. On the other hand, when receiving pressure greater than the set value, it provides high contact damping so as to prevent slip and thereby ensure safe placement. In addition, when receiving pressure smaller than the set value, the device has its pre-stressed structure generate modulation to displacement corresponding to the size of the pressure it receives for the purpose of shock absorbency.

71 Claims, 15 Drawing Sheets

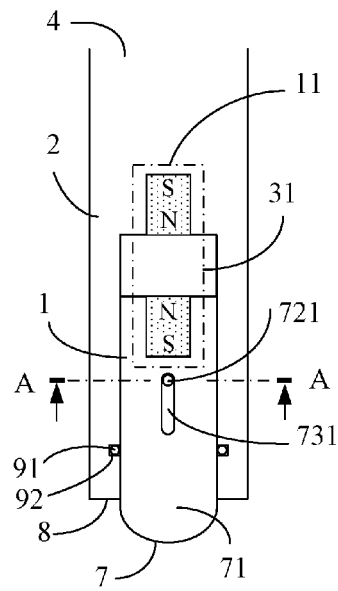
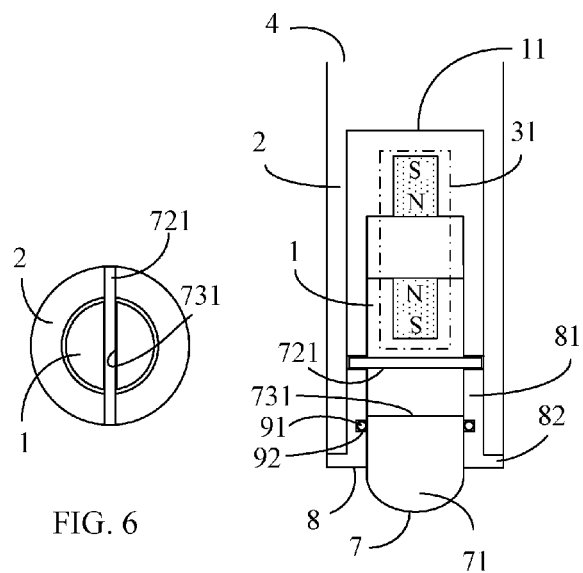
FIG. 5  FIG. 6  FIG. 7
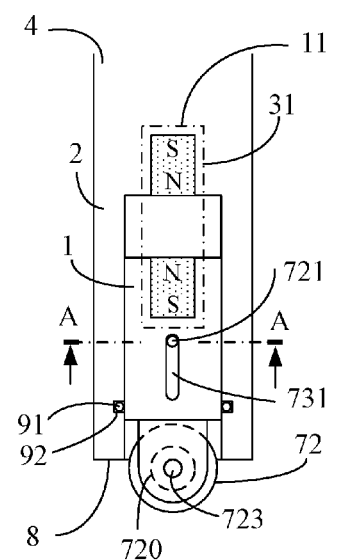
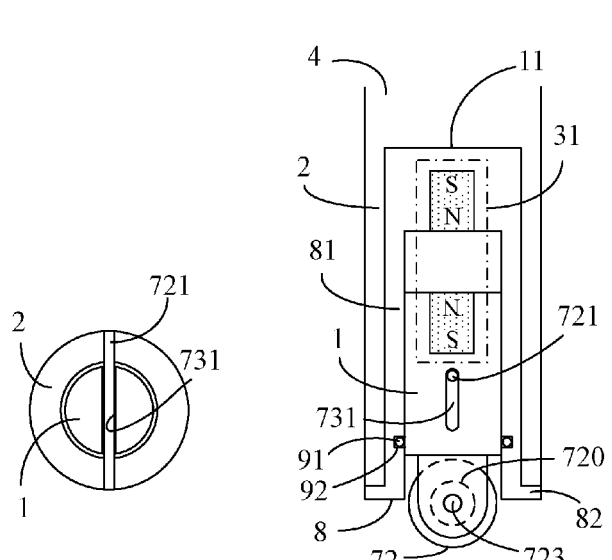
FIG. 8  FIG. 9  FIG. 10

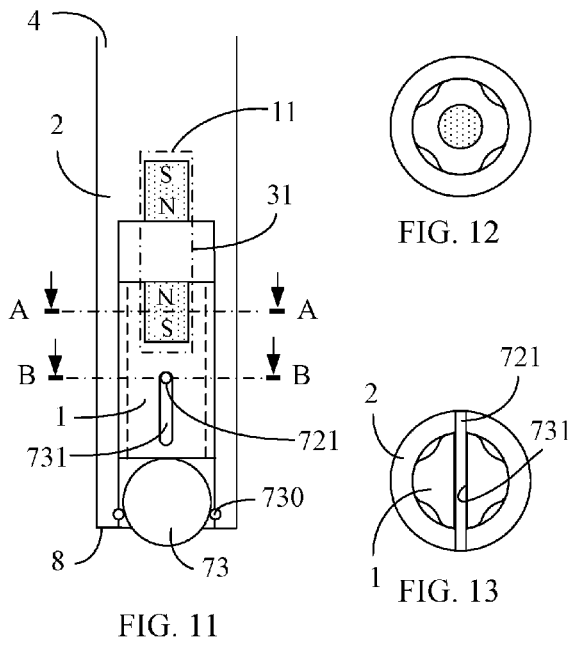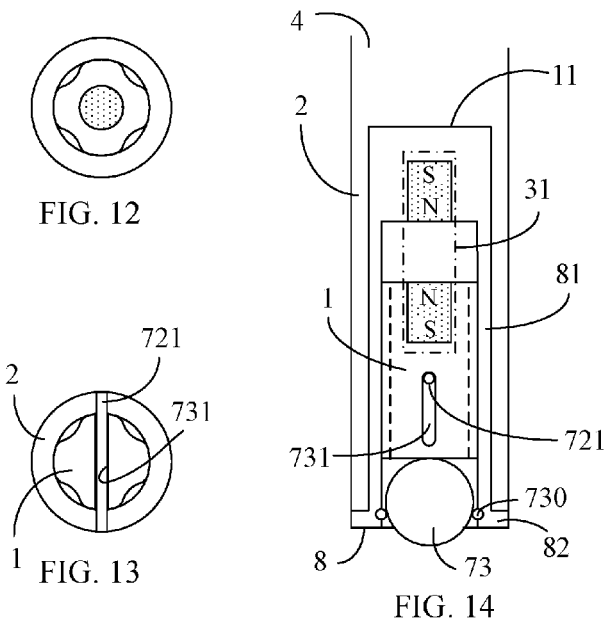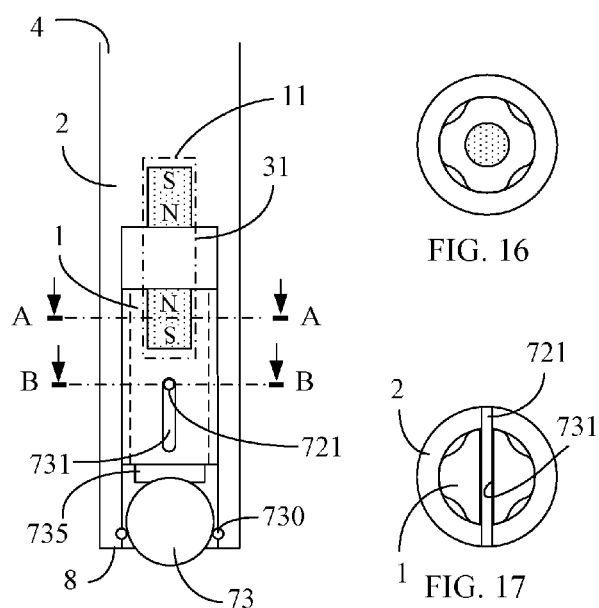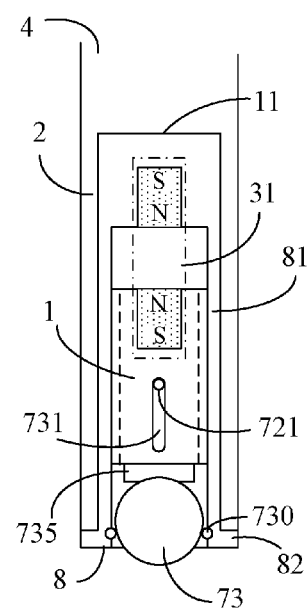

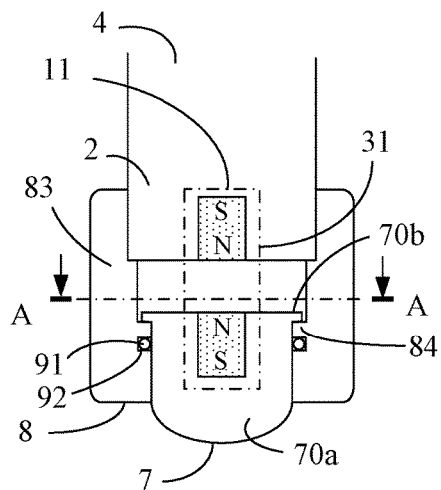
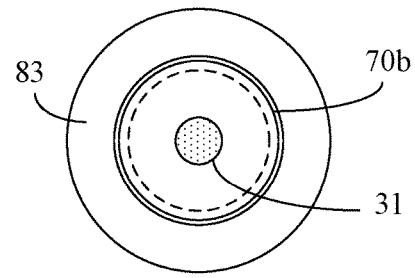
FIG. 19
FIG. 20
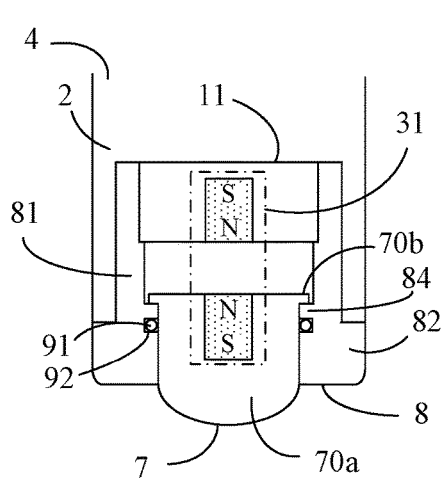
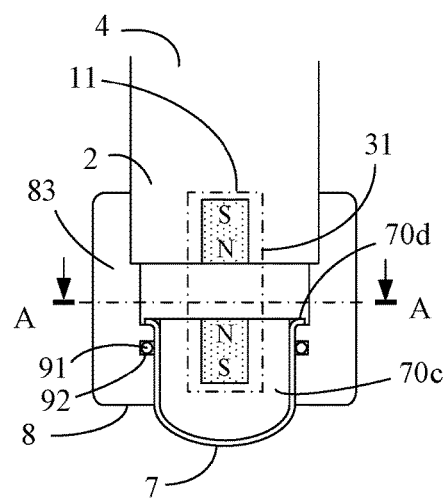
FIG. 21
FIG. 22

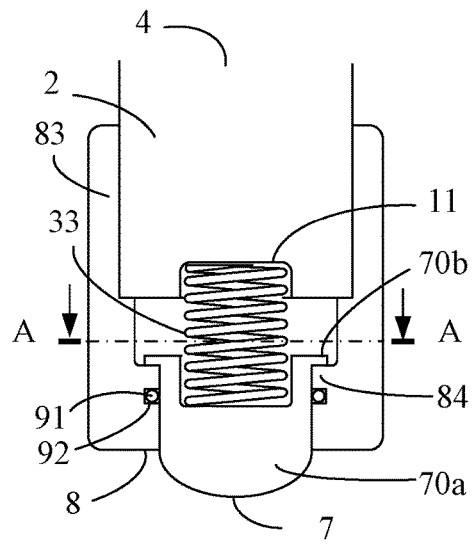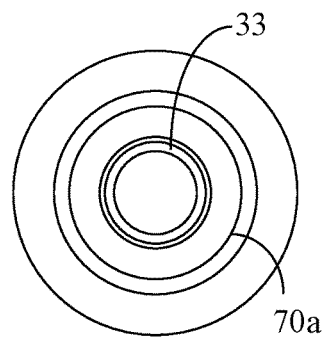
FIG. 23        FIG. 24
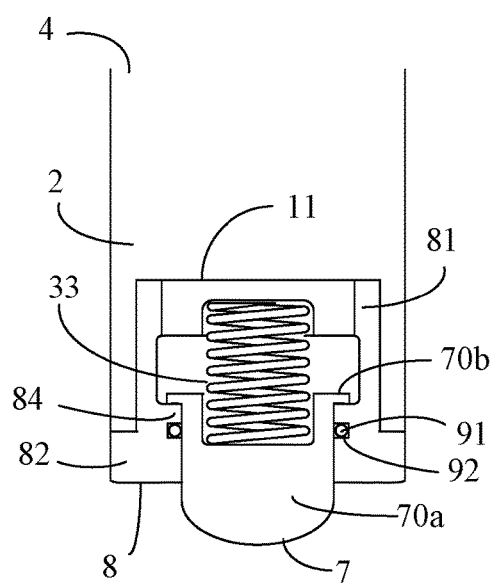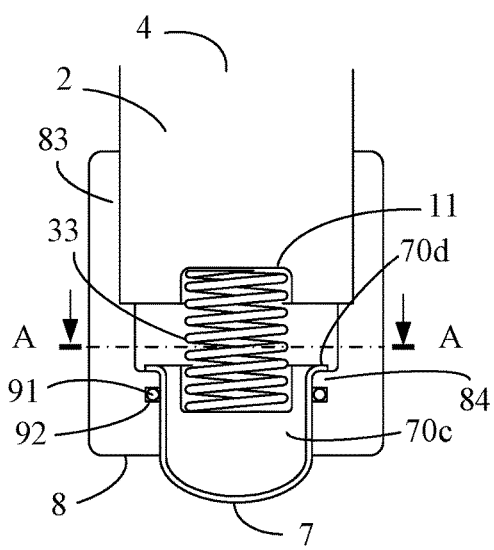
FIG. 25        FIG. 26

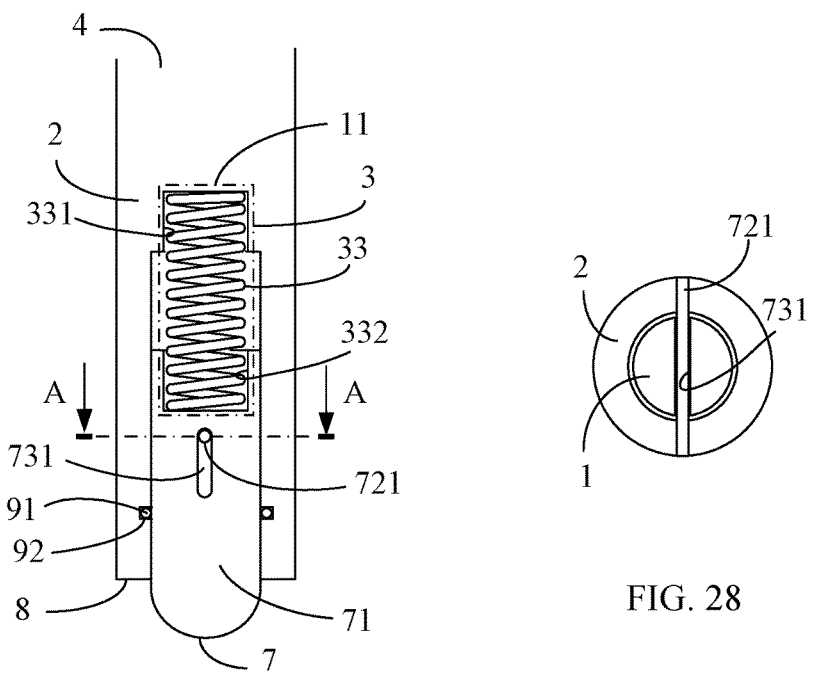
FIG. 27
FIG. 28
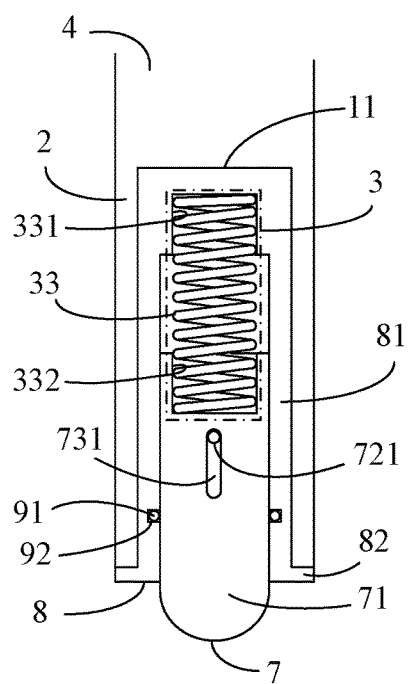
FIG. 29

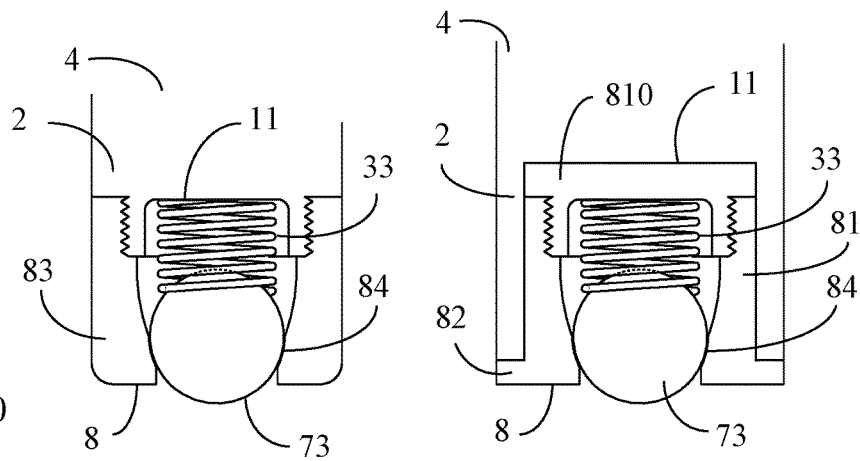
FIG. 30
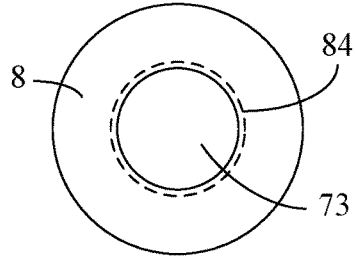
FIG. 31
FIG. 32
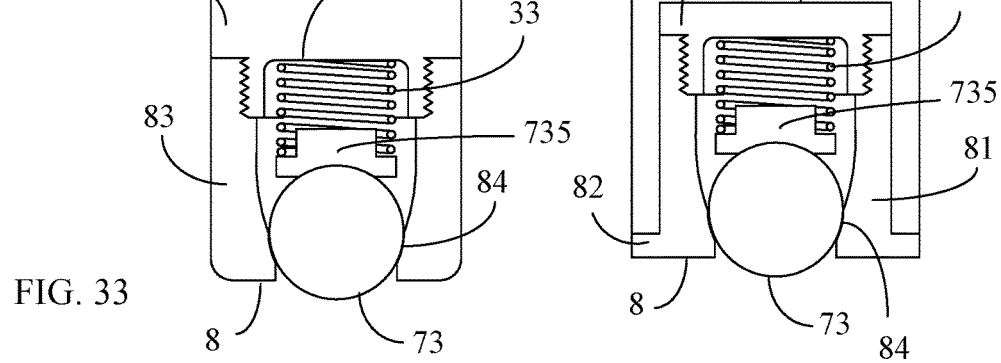
FIG. 33
FIG. 35
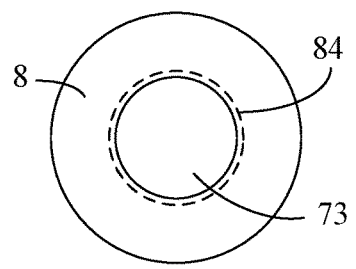
FIG. 34

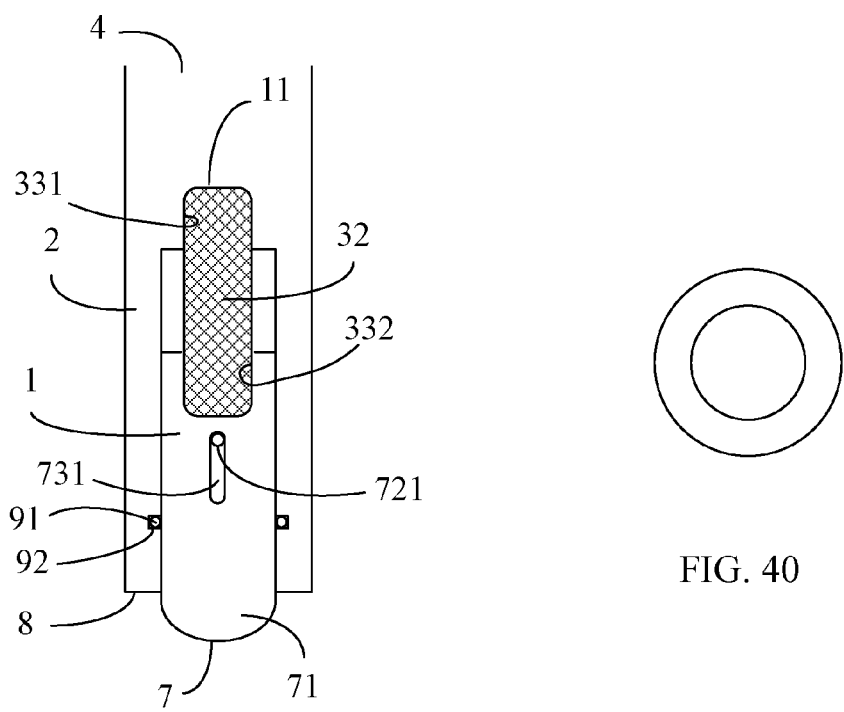
FIG. 39
FIG. 40
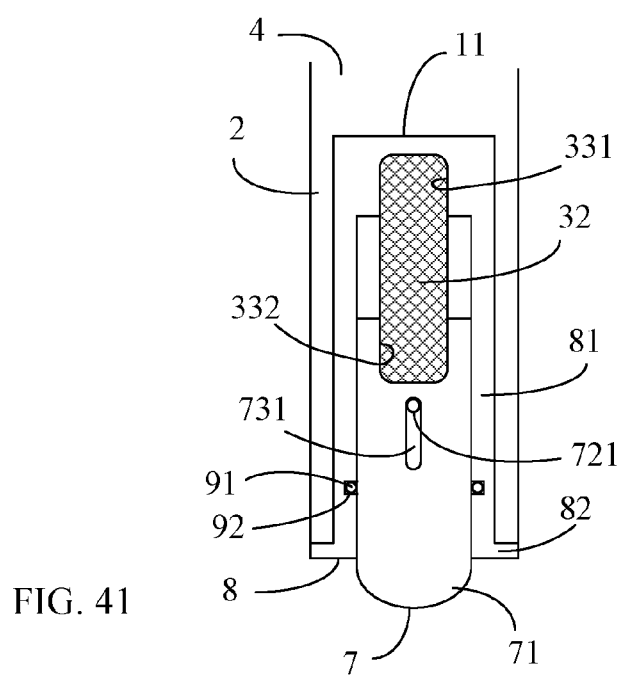
FIG. 41

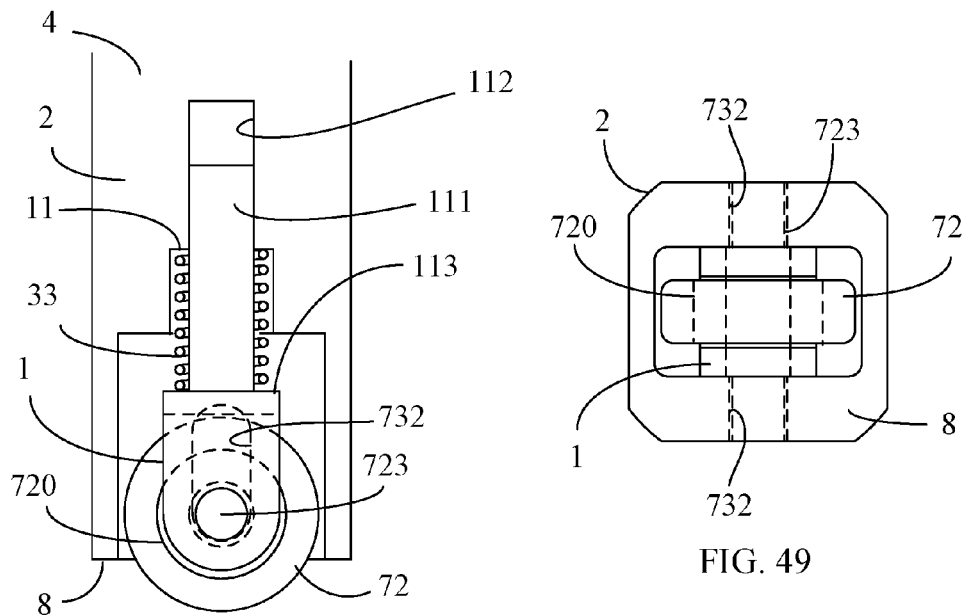
FIG. 48
FIG. 49
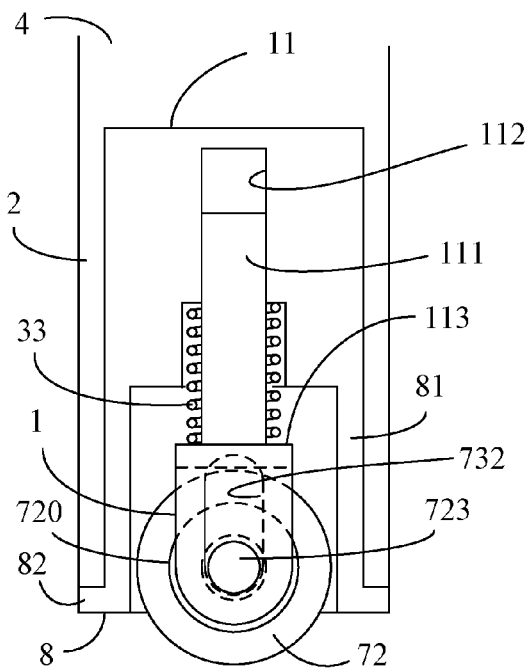
FIG. 50

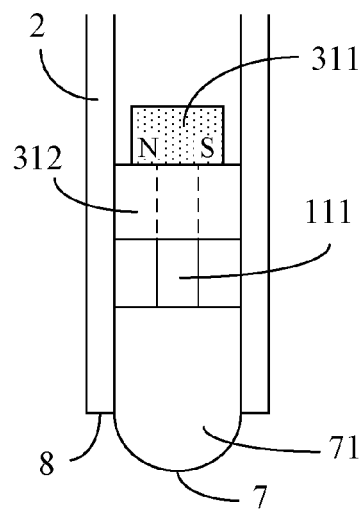
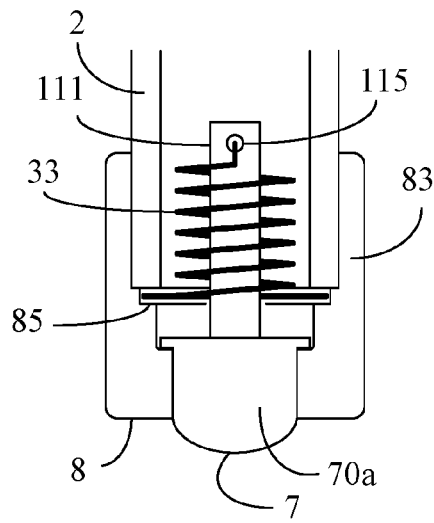
FIG. 54        FIG. 55
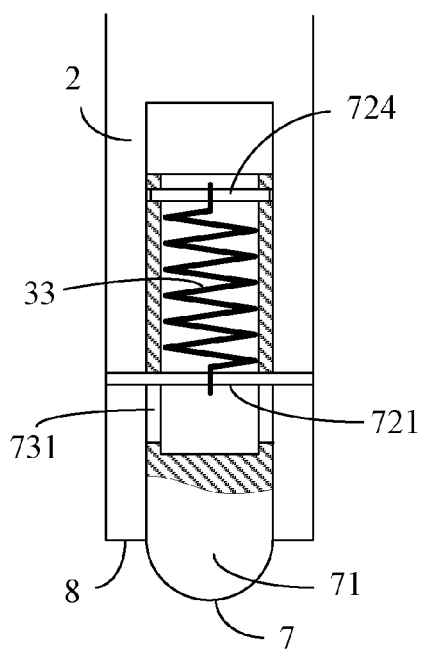
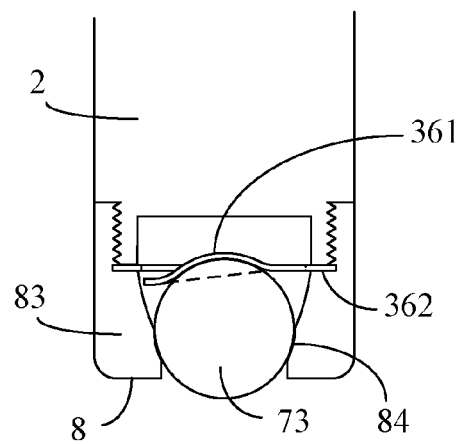
FIG. 56        FIG. 57

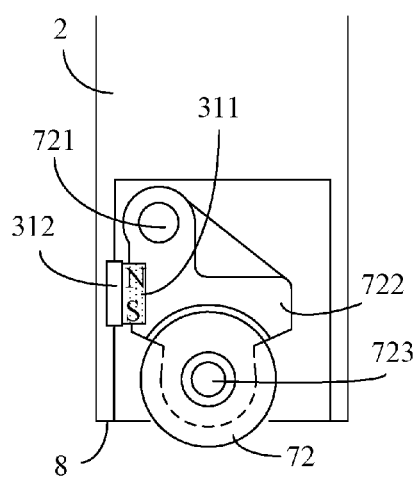
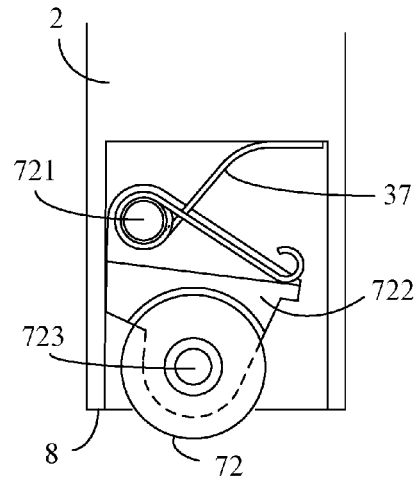
FIG. 58     FIG. 59
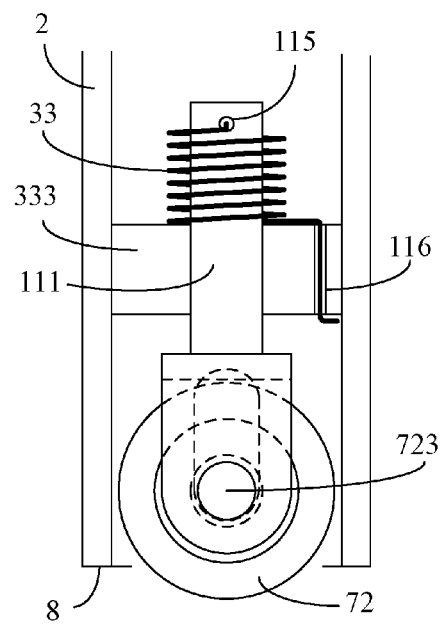
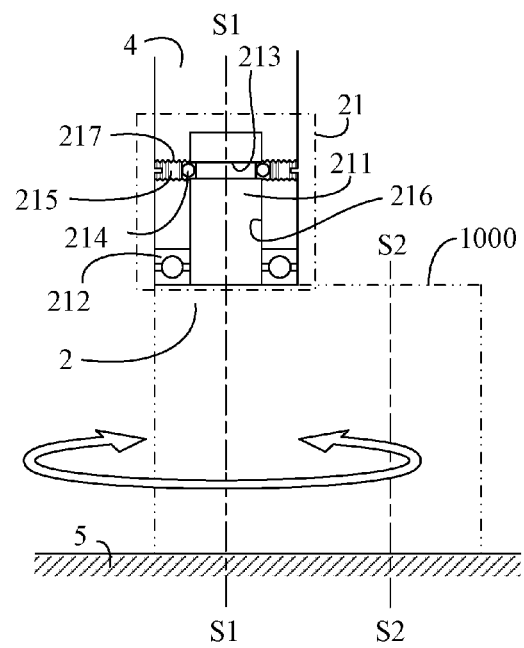
FIG. 60     FIG. 61

CARRIER DEVICE CAPABLE OF VARYING CONTACT DAMPING WITH PRESSURED DISPLACEMENT

BACKGROUND OF THE INVENTION

(a) Field of the Invention

The present invention provides one or more carrier devices capable of varying contact damping with pressured displacement. The device is configured to be installed on mechanical force-receiving structures that have rolling wheels, rolling balls or slidably displaceable terminal block structure, carrying devices and transportation devices for humans or objects. When receiving pressure smaller than a set value, the device provides low contact damping and is thus easy to move. On the other hand, when receiving pressure greater than the set value, it provides high contact damping so as to prevent slip and thereby ensure safe placement. In addition, when receiving pressure smaller than the set value, the device has its pre-stressed structure generate modulation to displacement corresponding to the size of the pressure it receives for the purpose of shock absorbency.

(b) Description of the Prior Art

The traditional mechanical force-receiving structures that have rolling wheels, rolling balls or slidably displaceable terminal block structure, carrying devices and transportation devices for humans or objects, such as chairs, tables, storage cabinets, tool cabinets, storage stools, rollators, transport carts, shopping carts, vehicles for people or goods, multi-function exercise bikes, mobile work platforms, mobile ladder stands, and mobile hangers. These mobile carriers for various loads are usually such designed that when receiving pressure smaller than a set value they provide low contact damping for easy movement, and when receiving pressure greater than the set value, they provide high contact damping for anti-slip, safe placement. One conventional approach to this end is blocking a force-receiving structure between the carrier device and its terminal support body from rolling by exerting an external force. This scheme, however, requires complicated operation in which a user tends to miss steps or make mistakes. Another solution works by making the carrying mechanism pressure and thus block the rolling mechanism under an increased load. In this case, the pressure made by the increased load to the carrying mechanism is directly put on the rolling mechanism, meaning that the original rolling mechanism is transformed to act as a terminal block providing high friction damping. Nevertheless this solution disadvantageously risks of damages to the rolling mechanism.

SUMMARY OF THE INVENTION

The present invention features that the disclosed carrier device capable of varying contact damping with pressured displacement has its second force-receiving structure (2) provide one end thereof as a carrying end (4) for bearing a load or stress, that the second force-receiving structure (2) has a limiting structure (11) extended therefrom and linked thereto that works with a pre-stressed structure (3) to form a first force-receiving structure (1), and that the first force-receiving structure (1) and the second force-receiving structure (2) jointly transfer the pressure from the load or stress to a terminal support body (5) wherein the first force-receiving structure (1) and the second force-receiving structure (2) are both located between the carrying end (4) and the terminal support body (5) so as to function as desired by varying force distribution between the first and second force-receiving structures (1),(2) and the terminal support body (5) with the pressure acting on the carrying end (4), wherein:

the pre-stressed structure (3): being located between the carrying end (4) and the first force-receiving structure (1) and capable of generating displacement corresponding to the pressure it receives, the pre-stressed structure (3) being constructed from a spring device, a pneumatic device, a hydraulic device incorporating pneumatic elements, or a magnetic device, and the pre-stressed structure being of one or both of constant and adjustable arrangement;

the carrying end (4): being located at one side of the second force-receiving structure (2), for bearing a load caused by an external force or an object it carries;

wherein the pre-stressed structure (3) located between the first force-receiving structure (1) and the limiting structure (11) extended from the second force-receiving structure (2) forms a structure that generates displacement corresponding to a force it receives, and has functions that:

when a pressure transferred from the carrying end (4) through the limiting structure (11) to act between the pre-stressed structure (3) together with the first force-receiving structure (1) and the terminal support body (5) is smaller than a set value, the first force-receiving structure (1) has a contact structure (7) having lower friction damping at one end thereof solely contact the terminal support body (5), and at this time a contact structure (8) having higher friction damping between the second force-receiving structure (2) and the terminal support body (5) does not bear the pressure from the carrying end (4), or bears only a part of the pressure that is smaller than or equal to that acting on the contact structure (7) having lower friction damping of the first force-receiving structure (1); and when a pressure transferred from the carrying end (4) through the limiting structure (11) to act between the pre-stressed structure (3) together with the first force-receiving structure (1) and the terminal support body (5) is greater than the set value, the first force-receiving structure (1) generates corresponding displacement, so that the contact structure (7) having lower friction damping and the contact structure (8) having higher friction damping of the second force-receiving structure (2) jointly contact the terminal support body (5), and at this time the pressure acting between the second force-receiving structure (2) and the terminal support body (5) is greater than or equal to that acting on the first force-receiving structure (1).

BRIEF DESCRIPTION OF THE DRAWINGS

FIG. 5 shows one embodiment of the present invention constructed from a magnetic pre-stressed device (31) and a terminal block (71) having lower friction damping.

FIG. 6 is a schematic cross-sectional view of the structure of FIG. 5 taken along Line A-A.

FIG. 7 schematically shows one embodiment of the assembled structure of FIG. 5.

FIG. 8 shows one embodiment of the present invention constructed from a magnetic pre-stressed device (31) and a rolling wheel (72).

FIG. 9 is a schematic cross-sectional view of the structure of FIG. 8 taken along Line A-A.

FIG. 10 schematically shows one embodiment of the assembled structure of FIG. 8.

FIG. 11 shows one embodiment of the present invention constructed from a magnetic pre-stressed device (31) and a rolling ball (73).

FIG. 12 is a schematic cross-sectional view of the structure of FIG. 11 taken along Line A-A.

FIG. 13 is a schematic cross-sectional view of the structure of FIG. 11 taken along Line B-B.

FIG. 14 schematically shows one embodiment of the assembled structure of FIG. 11.

FIG. 15 schematically shows one embodiment of the present invention according to FIG. 11 wherein an intermediate pad (735) is provided between the magnetic pre-stressed device (31) and the rolling ball (73).

FIG. 16 is a schematic cross-sectional view of the structure of FIG. 15 taken along Line A-A.

FIG. 17 is a schematic cross-sectional view of the structure of FIG. 15 taken along Line B-B.

FIG. 18 schematically shows one embodiment of the assembled structure of FIG. 15.

FIG. 19 schematically shows one embodiment of the present invention constructed from a magnetic pre-stressed device (31) and a semi-spherical terminal block (70a).

FIG. 20 is a schematic cross-sectional view of the structure of FIG. 19 taken along Line A-A.

FIG. 21 schematically shows one embodiment of the assembled structure of FIG. 19.

FIG. 22 schematically shows one embodiment of the structure of FIG. 19, wherein the semi-spherical terminal block (70a) is replaced with a semi-spherical cup-shaped structure (70c).

FIG. 23 schematically shows one embodiment of the present invention constructed from a spiral spring pre-stressed device (33) and a semi-spherical terminal block (70a).

FIG. 24 is a schematic cross-sectional view of the structure of FIG. 23 taken along Line A-A.

FIG. 25 schematically shows one embodiment of the assembled structure of FIG. 23.

FIG. 26 schematically shows one embodiment wherein the semi-spherical terminal block (70a) of FIG. 23 is replaced with a semi-spherical cup-shaped structure (70c).

FIG. 27 schematically shows one embodiment of the present invention constructed from a spiral spring pre-stressed device (33) and a terminal block (71) having lower friction damping.

FIG. 28 is a schematic cross-sectional view of the structure of FIG. 27 taken along Line A-A.

FIG. 29 schematically shows one embodiment of the assembled structure of FIG. 27.

FIG. 30 schematically shows one embodiment of the present invention constructed from a spiral spring pre-stressed device (33) and a rolling ball (73).

FIG. 31 is a bottom view according to FIG. 30.

FIG. 32 schematically shows one embodiment of the assembled structure of FIG. 30.

FIG. 33 schematically shows one embodiment of the present invention constructed from a spiral spring pre-stressed device (33), an intermediate pad (735), and a rolling ball (73).

FIG. 34 is a bottom view according to FIG. 33.

FIG. 35 schematically shows one embodiment of the assembled structure of FIG. 33.

FIG. 39 schematically shows one embodiment of the present invention constructed from an elastic material pre-stressed device (32) and a terminal block (71) having lower friction damping.

FIG. 40 is a bottom view according to FIG. 39.

FIG. 41 schematically shows one embodiment of the assembled structure of FIG. 39.

FIG. 48 schematically shows one embodiment of the present invention constructed from a spiral spring pre-stressed device (33) and a single rolling wheel (72).

FIG. 49 is a bottom view according to FIG. 48.

FIG. 50 schematically shows one embodiment of the assembled structure of FIG. 48.

FIG. 54 is the first schematic structural embodiment of the present invention showing the pre-stressed structure (3) providing pressured displacement using energy stored as expansive prestress.

FIG. 55 is the second schematic structural embodiment of the present invention showing the pre-stressed structure (3) providing pressured displacement using energy stored as expansive prestress.

FIG. 56 is the third schematic structural embodiment of the present invention showing the pre-stressed structure (3) providing pressured displacement using energy stored as expansive prestress.

FIG. 57 is the fourth schematic structural embodiment of the present invention showing the pre-stressed structure (3) providing pressured displacement using energy stored as expansive prestress.

FIG. 58 is the fifth schematic structural embodiment of the present invention showing the pre-stressed structure (3) providing pressured displacement using energy stored as expansive prestress.

FIG. 59 is the sixth schematic structural embodiment of the present invention showing the pre-stressed structure (3) providing pressured displacement using energy stored as expansive prestress.

FIG. 60 is the seventh schematic structural embodiment of the present invention showing the pre-stressed structure (3) providing pressured displacement using energy stored as expansive prestress.

FIG. 61 schematically shows an embodiment that the present invention is provided with the axial rotating structure (21).

Figure 1:
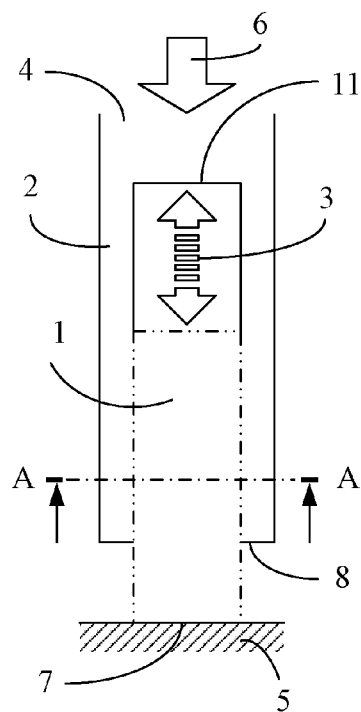
FIG. 1 schematically shows the main structure of the present invention.

DESCRIPTION OF MAIN COMPONENT SYMBOLS (1): first force-receiving structure
(11): limiting structure
(111): guide rod
(112): guide hole
(113): stepped structure
(115)-(116): spring positioning hole
(2): second force-receiving structure
(21): axial rotating structure
(211): shaft post
(212): bearing
(213): axial positioning annular slot
(214): positioning ball
(215): positioning bolt
(216): hole seat
(217): lateral screw hole
(3): pre-stressed structure
(31): magnetic pre-stressed device
(311): permanent magnet
(312): magnetic conductive member
(32): elastic material pre-stressed device
(33): spiral spring pre-stressed device
(331)-(332): recess
(333): structural block
(34): U-shaped leaf spring with concaved contact surface
(35): U-shaped leaf spring pre-stressed device
(361): leaf spring preloaded sheet
(362): leaf spring fastening side
(37): preloaded spring
(4): carrying end
(5): terminal support body
(6): load
(7): contact structure having lower friction damping
(70*a*): semi-spherical terminal block
(70*b*): annular flange structure
(70*c*): semi-spherical cup-shaped structure
(70*d*): outwardly-extended annular sheet
(71): terminal block having lower friction damping
(72)-(72')-(72"): rolling wheel
(720): bearing
(721)-(724): pin
(722): wheel arm
(723): shaft
(73): rolling ball
(730): limiting ring
(731): guide slot
(732): guide slot
(735): intermediate pad
(8): contact structure having higher friction damping (81): assembled auxiliary for second force-receiving structure
(810): intermediate assembling member of second force-receiving structure
(82): flange
(83): outer auxiliary for second force-receiving structure
(84): inwardly-retracted flange
(85): stepped structure
(91): sealing ring
(92): annular sealing slot
(1000): carrier device assembly capable of varying contact damping with pressured displacement
(S1): revolving axial line at carrying end
(S2): pressure line of first force-receiving structure (1) and terminal
support body (5)

DETAILED DESCRIPTION OF THE PREFERRED EMBODIMENTS

The traditional mechanical force-receiving structures that have rolling wheels, rolling balls or slidably displaceable terminal block structure, carrying devices and transportation devices for humans or objects, such as chairs, tables, storage cabinets, tool cabinets, storage stools, rollators, transport carts, shopping carts, vehicles for people or goods, multi-function exercise bikes, mobile work platforms, mobile ladder stands, and mobile hangers. These mobile carriers for various loads are usually such designed that they when receiving pressure smaller than a set value provide low contact damping and are easy to move, and when receiving pressure greater than the set value, provide high contact damping for anti-slip, safe placement. One conventional approach to this end is blocking a force-receiving structure between the carrier device and its terminal support body from rolling by exerting an external force. This scheme, however, requires complicated operation in which a user tends to miss steps or make mistakes. Another solution works by making the carrying mechanism pressure and thus block the rolling mechanism under an increased load. In this case, the pressure made by the increased load to the carrying mechanism is directly put on the rolling mechanism, meaning that the original rolling mechanism is transformed to act as a terminal block providing high friction damping. Nevertheless this solution disadvantageously risks of damages to the rolling mechanism.

The present invention provides one or more carrier devices capable of varying contact damping with pressured displacement. The device is configured to be installed on mechanical force-receiving structures that have rolling wheels, rolling balls or slidably displaceable terminal block structure, carrying devices and transportation devices for humans or objects. In use, the carrier device capable of varying contact damping with pressured displacement when receiving pressure smaller than a set value, is easy to move, and when receiving pressure greater than the set value, provides anti-slip, safe placement. The carrier device generates displacement corresponding to the weight and/or pressure it receives at its carrying end (4), so as to provide variable friction damping between the carrying end (4) and a terminal support body (5) it contacts, and when receiving pressure smaller than a set value, the device has its pre-stressed structure generate modulation to displacement corresponding to the size of the pressure it receives for the purpose of shock absorbency.

Figure 2:
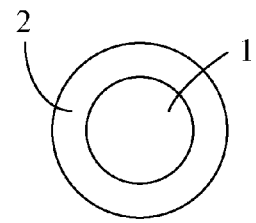
FIG. 2 is a schematic cross-sectional view of the structure of FIG. 1 taken along Line A-A.
Figure 3:
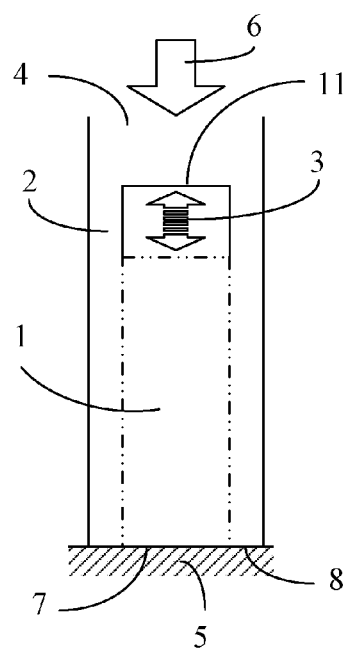
FIG. 3 schematically shows the structure of FIG. 1 wherein a load threshold set therefor is surpassed.

The present invention features that the disclosed carrier device capable of varying contact damping with pressured displacement has its second force-receiving structure (2) provide one end thereof as a carrying end (4) for bearing a load or stress, that the second force-receiving structure (2) has a limiting structure (11) extended therefrom and linked thereto that works with a pre-stressed structure (3) to form a first force-receiving structure (1), and that the first force-receiving structure (1) and the second force-receiving structure (2) jointly transfer the pressure from the load or stress to a terminal support body (5) wherein the first force-receiving structure (1) and the second force-receiving structure (2) are both located between the carrying end (4) and the terminal support body (5) so as to function as desired by varying force distribution between the first and second force-receiving structures (1),(2) and the terminal support body (5) with the pressure acting on the carrying end (4);

Therein, the pre-stressed structure (3) is provided between the first force-receiving structure (1) and the limiting structure (11) that is extended from and linked to the second force-receiving structure (2), and forms a structure that generates displacement corresponding to a force it receives;

The main structure of the carrier device capable of varying contact damping with pressured displacement will be described below with reference to the drawings wherein:

FIG. 1 schematically shows the main structure of the present invention;

FIG. 2 is a schematic cross-sectional view of the structure of FIG. 1 taken along Line A-A; and FIG. 3 schematically shows the structure of FIG. 1 wherein a load threshold set therefor is surpassed.

It primarily comprises the following components:
the first force-receiving structure (1): being constructed from materials and structures having sufficient supporting capability, and configured to bear a pressure coining from the carrying end (4) through the limiting structure (11) and the pre-stressed structure (3) and acting between the contact structure (7) having lower friction damping of the first force-receiving structure (1) and the terminal support body (5) that contacts the contact structure (7) and is the ground, a structure platform, or a structural plane, meaning that the pre-stressed structure (3) is located between one side of the first force-receiving structure (1) and the limiting structure (11) that is extended from and linked to the second force-receiving structure (2), and the contact structure (7) having lower friction damping is provide at an opposite side of the first force-receiving structure (1) for contacting the terminal support body (5), so as to receive the prestress from the pre-stressed structure (3) and pass the prestress to the terminal support body (5) it contacts;
wherein the contact structure (7) having lower friction damping of the first force-receiving structure (1) for contacting the terminal support body (5) is constructed from a terminal block (71) having lower friction damping that has sliding capability or a rolling wheel (72) or a rolling ball (73) that has rolling capability;
the second force-receiving structure (2): being constructed from materials and structures having sufficient strength and supporting capability, having one end thereof provided with a contact structure (8) having higher friction damping, and having an opposite end served as a carrying end (4), the second force-receiving structure (2) further having the limiting structure (11) extended therefrom and linked thereto, for allowing the pre-stressed structure (3) to be provided between the limiting structure (11) and the first force-receiving structure (1), so that when a pressure acting between the carrying end (4) and first force-receiving structure (1) varies, the pre-stressed structure (3) generates corresponding displacement;
the pre-stressed structure (3): being provided between the carrying end (4) and the first force-receiving structure (1), being capable of generating displacement corresponding to the pressure it receives, the pre-stressed structure (3) being constructed from a spring device, or a pneumatic device, or a hydraulic device incorporating pneumatic elements, or a magnetic device, and the pre-stressed structure being of one or both of constant and adjustable arrangement; and
the carrying end (4): being located at one side of the second force-receiving structure (2), for bearing a load caused by an external force or an object it carries;

With the aforementioned configuration, the carrier device capable of varying contact damping with pressured displacement has the functions including that:

when a pressure transferred from the carrying end (4) through the limiting structure (11) to act between the pre-stressed structure (3) together with the first force-receiving structure (1) and the terminal support body (5) is smaller than a set value, the first force-receiving structure (1) has a contact structure (7) having lower friction damping at one end thereof solely contact the terminal support body (5), and at this time a contact structure (8) having higher friction damping between the second force-receiving structure (2) and the terminal support body (5) does not bear the pressure from the carrying end (4), or bears only a part of the pressure that is smaller than or equal to that acting on the contact structure (7) having lower friction damping of the first force-receiving structure (1), as shown in FIG. 1; and when a pressure transferred from the carrying end (4) through the limiting structure (11) to act between the pre-stressed structure (3) together with the first force-receiving structure (1) and the terminal support body (5) is greater than the set value, the first force-receiving structure (1) generates corresponding displacement, so that the contact structure (7) having lower friction damping and the contact structure (8) having higher friction damping of the second force-receiving structure (2) jointly contact the terminal support body (5), and at this time the pressure acting between the second force-receiving structure (2) and the terminal support body (5) is greater than or equal to that acting on the first force-receiving structure (1), as shown in FIG. 3;

The contact structure (7) having lower friction damping of the first force-receiving structure (1) for contacting the terminal support body (5) is constructed from one or more of the following structures:
  (1) a terminal block (71) having lower friction damping;
  (2) a rolling wheel (72); and
  (3) a rolling ball (73);

The structure of the second force-receiving structure (2) for contacting the terminal support body (5) is a contact structure (8) having higher friction damping constructed from materials and structural geometry that provide higher friction damping;

Under the same given pressure, the frictional resistance at the contact interface between the contact structure (7) having lower friction damping of the first force-receiving structure (1) and the terminal support body (5) is smaller than that at the contact interface between the contact structure (8) having higher friction damping of the second force-receiving structure (2) and the terminal support body (5);

The pressure acting between the carrying end (4) and the terminal support body (5) is a sum of its own weight and the load (6) put on the carrying end (4) and/or the pressure the carrying end (4) bears;

The carrier device capable of varying contact damping with pressured displacement without changing its operational principles may be further constructed from assembled structures;

The structure disclosed by FIG. 1 except for being constructed by combining the foregoing individual parts, it may alternatively be constructed by combining the first force-receiving structure (1), the pre-stressed structure (3), and the assembled auxiliary (81) for the second force-receiving structure first, and then combining the resulting assembly with the second force-receiving structure (2).

Figure 4:
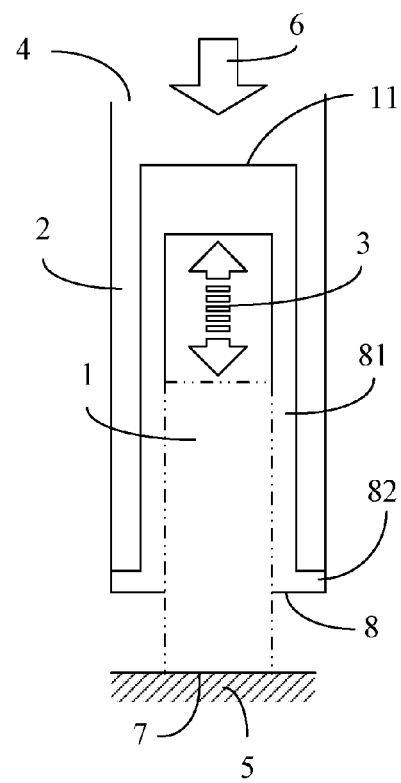
FIG. 4 schematically shows an embodiment of the assembled structure of FIG. 1.

FIG. 4 schematically shows an embodiment of the assembled structure of FIG. 1.

As shown in FIG. 4, the assembled auxiliary (81) for the second force-receiving structure is installed between the second force-receiving structure (2) and the first force-receiving structure (1) together with its pre-stressed structure (3); the assembled auxiliary (81) for the second force-receiving structure at its one end close to the terminal support body (5) has a flange (82), the flange (82) has its bottom provided with a contact structure (8) having higher friction damping, the assembled auxiliary (81) for the second force-receiving structure contains therein the first force-receiving structure (1), the first force-receiving structure (1) at its one end is provided with a contact structure (7) having lower friction damping for contacting the terminal support body (5), and a pre-stressed structure (3) is provided between an opposite end of the first force-receiving structure (1) and the limiting structure (11);

The foregoing limiting structure (11) is constructed from a top structure of the assembled auxiliary (81) for the second force-receiving structure and/or from a structure extended from a carrying end (4) combined with the second force-receiving structure (2);

The structure shown in FIG. 1 and FIG. 2 and the assembled structure shown in FIG. 4 works as described below:

When pressure transferred from the carrying end (4) through the limiting structure (11) to act between the pre-stressed structure (3) together with the first force-receiving structure (1) and the terminal support body (5) is smaller than a set value, the first force-receiving structure (1) has the contact structure (7) having lower friction damping at one end thereof solely contact the terminal support body (5), and at this time the contact structure (8) having higher friction damping between the second force-receiving structure (2) and the terminal support body (5) does not bear the pressure from the carrying end (4), or bears only a part of the pressure that is smaller than or equal to that acting on the contact structure (7) having lower friction damping of the first force-receiving structure (1), as shown in FIG. 1;

When pressure transferred from the carrying end (4) through the limiting structure (11) to act between the pre-stressed structure (3) together with the first force-receiving structure (1) and the terminal support body (5) is greater than the set value, the first force-receiving structure (1) generates corresponding displacement, so that the contact structure (7) having lower friction damping and the contact structure (8) having higher friction damping of the second force-receiving structure (2) jointly contact the terminal support body (5), and at this time the pressure acting between the second force-receiving structure (2) and the terminal support body (5) is greater than or equal to that acting on the first force-receiving structure (1).

The carrier device capable of varying contact damping with pressured displacement may be formed into various structural forms sharing the same operational principles, and while some embodiments and related description will be discussed below for illustration, they are not intended to pose limitation to the present invention;

FIG. 5 shows one embodiment of the present invention constructed from a magnetic pre-stressed device (31) and a terminal block (71) having lower friction damping.

FIG. 6 is a schematic cross-sectional view of the structure of FIG. 5 taken along Line A-A.

As shown in FIGS. 5 and 6, it primarily comprises the following components:

the first force-receiving structure (1): being constructed from a terminal block (71) having lower friction damping that is capable of shift in an inner space of the second force-receiving structure (2), a pre-stressed structure (3) constructed from a magnetic pre-stressed device (31) being provided between one end of the first force-receiving structure (1) and the limiting structure (11) extended from and linked to the second force-receiving structure (2), and a contact structure (7) having lower friction damping being provided at an opposite end of the first force-receiving structure (1) and facing the terminal support body (5);

the second force-receiving structure (2): being constructed from materials and structures having sufficient strength and supporting capability, having one end thereof combined with the carrying end (4), and having an opposite end thereof provided with a contact structure (8) having higher friction damping, and a pre-stressed structure (3) constructed from a magnetic pre-stressed device (31) being provided between the limiting structure (11) extended from and linked to the second force-receiving structure (2) and the first force-receiving structure (1) constructed from the terminal block (71) having lower friction damping; and the magnetic pre-stressed device (31): including permanent magnets that are such arranged between the limiting structure (11) extended from and linked to the second force-receiving structure (2) and the first force-receiving structure (1) that they face each other with the same polarity so as to have mutual repellence;

An axial displacement limiting structure is provided between the first force-receiving structure (1) and the second force-receiving structure (2) for preventing the first force-receiving structure (1) from departing from the second force-receiving structure (2); in the present embodiment, the limiting function is realized by a guide slot (731) passing through the first force-receiving structure (1) and a pin (721) of the second force-receiving structure (2); and the foregoing axial displacement limiting structure constructed from the pin (721) and the guide slot (731) is merely one example and may be realized by alternative structures that have the same limiting capability.

The structure disclosed by FIG. 5 except for being constructed by combining the foregoing individual parts, it may alternatively be constructed by combining the first force-receiving structure (1), the pre-stressed structure (3), and the assembled auxiliary (81) for the second force-receiving structure first, and then combining the resulting assembly with the second force-receiving structure (2);

FIG. 7 schematically shows one embodiment of the assembled structure of FIG. 5.

As shown in FIG. 7, it primarily comprises the following components:

the first force-receiving structure (1): being constructed from a terminal block (71) having lower friction damping and installed in an inner space of an assembled auxiliary (81) for the second force-receiving structure, so as to be able to shift in the inner space of the assembled auxiliary (81) for the second force-receiving structure, the first force-receiving structure (1) having one end thereof provided with a contact structure (7) having lower friction damping that faces the terminal support body (5), and a pre-stressed structure (3) constructed from a magnetic pre-stressed device (31) being provided between an opposite end of the first force-receiving structure (1) and a limiting structure (11) at the top of the inner space of the assembled auxiliary (81) for the second force-receiving structure;

the second force-receiving structure (2): being constructed from materials and structures having sufficient strength and supporting capability, having one end thereof combined with the carrying end (4), and having an opposite end thereof combined with the assembled auxiliary (81) for the second force-receiving structure;

the assembled auxiliary (81) for the second force-receiving structure: being installed in an inner space at one end of the second force-receiving structure (2) close to the terminal support body (5), the assembled auxiliary (81) for the second force-receiving structure having its structural end facing the terminal support body (5) provided with a flange (82), the flange (82) having its end facing the terminal support body (5) provided with a contact structure (8) having higher friction damping, the first force-receiving structure (1) being installed in the inner space of the assembled auxiliary (81) for the second force-receiving structure, a pre-stressed structure (3) constructed from a magnetic pre-stressed device (31) being provided between the assembled auxiliary (81) for the second force-receiving structure and the first force-receiving structure (1); the foregoing assembled auxiliary (81) for the second force-receiving structure and the second force-receiving structure (2) may be combined in one or more ways of:

1) the two being combined by means of press-fit insertion;
2) the two being combined by means of mating spiral structures;
3) the two being fastened by laterally passing through pins;
4) the two being fastened by laterally installed screws;
5) the two being welded together; and
6) the two being bonded together; and the magnetic pre-stressed device (31): including permanent magnets that are such arranged between the limiting structure (11) at the top of the inner space of the assembled auxiliary (81) for the second force-receiving structure and one end of the first force-receiving structure (1) that they face each other with the same polarity so as to have mutual repellence;

An axial displacement limiting structure is provided between the first force-receiving structure (1) and the flange (82) of the assembled auxiliary (81) for the second force-receiving structure for preventing the first force-receiving structure (1) from departing from the assembled auxiliary (81) for the second force-receiving structure; in the present embodiment, limiting function is realized by a guide slot (731) passing through the first force-receiving structure (1) and a pin (721) of the assembled auxiliary (81) for the second force-receiving structure, and the foregoing axial displacement limiting structure constructed from the pin (721) and the guide slot (731), however, is merely one example and may be realized by alternative structures that have the same limiting capability.

FIG. 8 shows one embodiment of the present invention constructed from a magnetic pre-stressed device (31) and a rolling wheel (72).

FIG. 9 is a schematic cross-sectional view of the structure of FIG. 8 taken along Line A-A As shown in FIGS. 8 and 9, it primarily comprises the following components:

the first force-receiving structure (1): being constructed from a structure that is capable of shifting in an inner space of the second force-receiving structure (2), a pre-stressed structure (3) constructed from a magnetic pre-stressed device (31) being provided between one end of the first force-receiving structure (1) and the limiting structure (11) extended from and linked to the second force-receiving structure (2), a rolling wheel (72) being provided at an opposite end of the first force-receiving structure (1), and a shaft (723) and a bearing (720) being provided between the rolling wheel (72) and the second force-receiving structure (2);

the second force-receiving structure (2): being constructed from materials and structures having sufficient strength and supporting capability, having one end thereof combined with the carrying end (4), and having an opposite end thereof provided with a contact structure (8) having higher friction damping, and a pre-stressed structure (3) constructed from a magnetic pre-stressed device (31) being provided between the limiting structure (11) extended from and linked to the second force-receiving structure (2) and the first force-receiving structure (1) having a rolling wheel (72); and the magnetic pre-stressed device (31): including permanent magnets that are such arranged between the limiting structure (11) extended from and linked to the second force-receiving structure (2) and the first force-receiving structure (1) that they face each other with the same polarity so as to have mutual repellence;

An axial displacement limiting structure is provided between the first force-receiving structure (1) and the second force-receiving structure (2) for preventing the first force-receiving structure (1) from departing from the second force-receiving structure (2); in the present embodiment, the limiting function is realized by a guide slot (731) passing through the first force-receiving structure (1) and a pin (721) of the second force-receiving structure (2), and the foregoing axial displacement limiting structure constructed from the pin (721) and the guide slot (731), however, is merely one example and may be realized by alternative structures that have the same limiting capability.

The structure disclosed by FIG. 8 except for being constructed by combining the foregoing individual parts, it may alternatively being constructed by combining the first force-receiving structure (1), the pre-stressed structure (3), and the assembled auxiliary (81) for the second force-receiving structure first, and then combining the resulting assembly with the second force-receiving structure (2);

FIG. 10 schematically shows one embodiment of the assembled structure of FIG. 8.

As shown in FIG. 10, it primarily comprises the following components:

the first force-receiving structure (1): being installed in an inner space of the assembled auxiliary (81) for the second force-receiving structure and capable of shifting in the inner space of the assembled auxiliary (81) for the second force-receiving structure, the first force-receiving structure (1) having one end thereof provided with the rolling wheel (72) facing the terminal support body (5), and a pre-stressed structure (3) being provided between an opposite end of the first force-receiving structure (1) and the limiting structure (11) at the top of the inner space of the assembled auxiliary (81) for the second force-receiving structure, wherein the pre-stressed structure (3) is constructed from a magnetic pre-stressed device (31) in which permanent magnets face each other with the same polarity so as to have mutual repellence;

the second force-receiving structure (2): being constructed from materials and structures having sufficient strength and supporting capability, having one end thereof combined with the carrying end (4), and having an opposite end thereof combined with the assembled auxiliary (81) for the second force-receiving structure;

the assembled auxiliary (81) for the second force-receiving structure: being installed in an inner space of the second force-receiving structure (2) at its one end close to the terminal support body (5), the assembled auxiliary (81) for the second force-receiving structure having its structural end facing the terminal support body (5) provided with a flange (82), the flange (82) having its end facing the terminal support body (5) provided with a contact structure (8) having higher friction damping, the first force-receiving structure (1) being installed in the inner space of the assembled auxiliary (81) for the second force-receiving structure, a pre-stressed structure (3) constructed from a magnetic pre-stressed device (31) being provided between the assembled auxiliary (81) for the second force-receiving structure and the first force-receiving structure (1); and the foregoing assembled auxiliary (81) for the second force-receiving structure and the second force-receiving structure (2) may be combined in one or more ways of:

1) the two being combined by means of press-fit insertion;
2) the two being combined by means of mating spiral structures;
3) the two being fastened by laterally passing through pins;
4) the two being fastened by laterally installed screws;
5) the two being welded together; and
6) the two being bonded together; and the magnetic pre-stressed device (31): including permanent magnets that are such arranged between the limiting structure (11) at the top of the inner space of the assembled auxiliary (81) for the second force-receiving structure and the first force-receiving structure (1) that they face each other with the same polarity so as to have mutual repellence;

An axial displacement limiting structure is provided between the first force-receiving structure (1) and the flange (82) of the assembled auxiliary (81) for the second force-receiving structure for preventing the first force-receiving structure (1) from departing from the assembled auxiliary (81) for the second force-receiving structure; in the present embodiment, the limiting function is realized by a guide slot (731) passing through the first force-receiving structure (1) and a pin (721) of the assembled auxiliary (81) for the second force-receiving structure, and the foregoing axial displacement limiting structure constructed from the pin (721) and the guide slot (731), however, is merely one example and may be realized by alternative structures that have the same limiting capability.

FIG. 11 shows one embodiment of the present invention constructed from a magnetic pre-stressed device (31) and a rolling ball (73).

FIG. 12 is a schematic cross-sectional view of the structure of FIG. 11 taken along Line A-A.

FIG. 13 is a schematic cross-sectional view of the structure of FIG. 11 taken along Line B-B.

As shown in FIGS. 11, 12 and 13, it primarily comprises the following components:

the first force-receiving structure (1): being constructed from a structure that is capable of shifting in the inner space of the second force-receiving structure (2), a pre-stressed structure (3) constructed from a magnetic pre-stressed device (31) being provided between one end of the first force-receiving structure (1) and the limiting structure (11) extended from and linked to the carrying end (4), and an opposite end of the first force-receiving structure (1) being provided with a rolling ball (73);

the second force-receiving structure (2): being constructed from materials and structures having sufficient strength and supporting capability, having one end thereof combined with the carrying end (4), and having an opposite end thereof provided with a contact structure (8) having higher friction damping, and a pre-stressed structure (3) constructed from a magnetic pre-stressed device (31) being provided between the limiting structure (11) of the carrying end (4) and the first force-receiving structure (1) having the rolling ball (73); and the magnetic pre-stressed device (31): including permanent magnets that are such arranged between the limiting structure (11) extended from and linked to the second force-receiving structure (2) and the first force-receiving structure (1) that they face each other with the same polarity so as to have mutual repellence;

An axial displacement limiting device is provided between the first force-receiving structure (1) and the second force-receiving structure (2) for preventing the first force-receiving structure (1) from departing from the second force-receiving structure (2); in the present embodiment, the limiting function is realized by a guide slot (731) passing through the first force-receiving structure (1) and a pin (721) of the second force-receiving structure (2); in the present embodiment, after the rolling ball (73) is placed in the second force-receiving structure (2), a limiting ring (730) is installed at the inner side of the opening of the second force-receiving structure (2) facing the terminal support body (5) so as to form a limiting structure that prevents the rolling ball (73) from coining off; the foregoing limiting structure for preventing both the first force-receiving structure (1) and the rolling ball (73) from coining off is merely one example and may be realized by alternative structures that have the same limiting capability.

The structure disclosed by FIG. 11 except for being constructed by combining the foregoing individual parts, it may alternatively being constructed by combining the first force-receiving structure (1), the pre-stressed structure (3), and the assembled auxiliary (81) for the second force-receiving structure first, and then combining the resulting assembly with the second force-receiving structure (2);

FIG. 14 schematically shows one embodiment of the assembled structure of FIG. 11.

As shown in FIG. 14, it primarily comprises the following components:

the first force-receiving structure (1): being installed in an inner space of the assembled auxiliary (81) for the second force-receiving structure and capable of shifting in an inner space of the assembled auxiliary (81) for the second force-receiving structure, the first force-receiving structure (1) having its one end provided with a rolling ball (73) facing the terminal support body (5), and a pre-stressed structure (3) constructed from a magnetic pre-stressed device (31) being provided between an opposite end of the first force-receiving structure (1) and a limiting structure (11) at the top of the inner space of the assembled auxiliary (81) for the second force-receiving structure;

the second force-receiving structure (2): being constructed from materials and structures having sufficient strength and supporting capability, having one end thereof combined with the carrying end (4), and having an opposite end thereof combined with the assembled auxiliary (81) for the second force-receiving structure;

the assembled auxiliary (81) for the second force-receiving structure: being installed at one end of the second force-receiving structure (2) close to the terminal support body (5), the assembled auxiliary (81) for the second force-receiving structure having its structural end facing the terminal support body (5) provided with a flange (82), the flange (82) having its end facing the terminal support body (5) provided with a contact structure (8) having higher friction damping, the first force-receiving structure (1) being installed in the inner space of the assembled auxiliary (81) for the second force-receiving structure, a pre-stressed structure (3) constructed from a magnetic pre-stressed device (31) being provided between the assembled auxiliary (81) for the second force-receiving structure and the first force-receiving structure (1); wherein the foregoing assembled auxiliary (81) for the second force-receiving structure and the second force-receiving structure (2) may be combined in one or more ways of:

1) the two being combined by means of press-fit insertion;
2) the two being combined by means of mating spiral structures;
3) the two being fastened by laterally passing through pins;
4) the two being fastened by laterally installed screws;
5) the two being welded together; and
6) the two being bonded together; and the magnetic pre-stressed device (31): including permanent magnets that are such arranged between the limiting structure (11) at the top of the inner space of the assembled auxiliary (81) for the second force-receiving structure and one end of the first force-receiving structure (1) that they face each other with the same polarity so as to have mutual repellence;

An axial displacement limiting structure is provided between the first force-receiving structure (1) and the flange (82) of the assembled auxiliary (81) for the second force-receiving structure for preventing the first force-receiving structure (1) from departing from the assembled auxiliary (81) for the second force-receiving structure; in the present embodiment, the limiting function is realized by a guide slot (731) passing through the first force-receiving structure (1) and a pin (721) of the assembled auxiliary (81) for the second force-receiving structure; in the present embodiment, after the rolling ball (73) is placed in the second force-receiving structure (2), a limiting ring (730) is installed at the inner side of the opening of the assembled auxiliary (81) for the second force-receiving structure facing the terminal support body (5) so as to form a limiting structure that prevents the rolling ball (73) from coining off; and the foregoing limiting structure for preventing both the first force-receiving structure (1) and the rolling ball (73) from coining off is merely one example and may be realized by alternative structures that have the same limiting capability.

FIG. 15 schematically shows one embodiment of the present invention according to FIG. 11 wherein an intermediate pad (735) is provided between the magnetic pre-stressed device (31) and the rolling ball (73).

FIG. 16 is a schematic cross-sectional view of the structure of FIG. 15 taken along Line A-A.

FIG. 17 is a schematic cross-sectional view of the structure of FIG. 15 taken along Line B-B.

As shown in FIGS. 15, 16 and 17, the structure as shown in the embodiment of FIG. 11 includes the following components:

the first force-receiving structure (1);
the second force-receiving structure (2);
the magnetic pre-stressed device (31); and
an axial displacement limiting device being provided between the first force-receiving structure (1) and the second force-receiving structure (2) for preventing the first force-receiving structure (1) from departing from the second force-receiving structure (2); and having a limiting structure that prevents the rolling ball (73) from coining off;

Therein, an intermediate pad (735) is provided between the magnetic pre-stressed device (31) and the rolling ball (73), for reducing abrasion caused by direct contact between the rolling ball (73) and the magnetic pre-stressed device (31).

The structure disclosed by FIG. 15 except for being constructed by combining the foregoing individual parts, it may alternatively being constructed by combining the first force-receiving structure (1), the pre-stressed structure (3), and the assembled auxiliary (81) for the second force-receiving structure first, and then combining the resulting assembly with the second force-receiving structure (2).

FIG. 18 schematically shows one embodiment of the assembled structure of FIG. 15.

As shown in FIG. 18, it primarily comprises the following components:

the first force-receiving structure (1);
the second force-receiving structure (2);
the assembled auxiliary (81) for the second force-receiving structure;
the magnetic pre-stressed device (31); and
an axial displacement limiting structure being provided between the first force-receiving structure (1) and the flange (82) of the assembled auxiliary (81) for the second force-receiving structure, for preventing the first force-receiving structure (1) from departing from the assembled auxiliary (81) for the second force-receiving structure; and having a limiting structure that prevents the rolling ball (73) from coining off;

Therein, an intermediate pad (735) is provided between the magnetic pre-stressed device (31) and the rolling ball (73), for reducing abrasion caused by direct contact between the rolling ball (73) and the magnetic pre-stressed device (31).

FIG. 19 schematically shows one embodiment of the present invention constructed from a magnetic pre-stressed device (31) and a semi-spherical terminal block (70a).

FIG. 20 is a schematic cross-sectional view of the structure of FIG. 19 taken along Line A-A.

As shown in FIGS. 19 and 20, it primarily comprises the following components:

the first force-receiving structure (1): being constructed from a semi-spherical terminal block (70a) that is capable of shifting in the inner space of the second force-receiving structure (2), a pre-stressed structure (3) constructed from a magnetic pre-stressed device (31) being provided between one end of the first force-receiving structure (1) and the limiting structure (11) extended from and linked to the second force-receiving structure (2), and a contact structure (7) having lower friction damping being provided at an opposite end of the semi-spherical terminal block (70a);

the second force-receiving structure (2): being constructed from materials and structures having sufficient strength and supporting capability, having one end thereof combined with the carrying end (4), and having an opposite end thereof provided with a contact structure (8) having higher friction damping, and a pre-stressed structure (3) constructed from a magnetic pre-stressed device (31) being provided between a limiting structure (11) extended from and linked to the second force-receiving structure (2) and the first force-receiving structure (1) having the semi-spherical terminal block (70a);

the magnetic pre-stressed device (31): configured by permanent magnets that are such arranged between the limiting structure (11) extended from and linked to the second force-receiving structure (2) and the first force-receiving structure (1) having the semi-spherical terminal block (70a) that they face each other with the same polarity so as to have mutual repellence that allows them to form the pre-stressed structure (3); and the outer auxiliary (83) for second force-receiving structure: being a tubular structure made of materials and structures having sufficient strength and supporting capability, having one end thereof combined with the outer periphery of the second force-receiving structure (2), and having an opposite end thereof provided with a contact structure (8) having higher friction damping and an inwardly-retracted flange (84), and the outer auxiliary (83) for second force-receiving structure and the second force-receiving structure (2) being combined by means of screwed structures or interference fit or fit that is followed by pin fixing.

Therein the semi-spherical terminal block (70a) of the first force-receiving structure (1) is of a semi-spherical structure, with its slower side having a spherical projecting end facing the terminal support body (5) constructed as a contact structure (7) having lower friction damping, and with its upper end provided with the permanent magnet composing the magnetic pre-stressed device (31), an outward-expanding annular flange structure (70b) is provided at its upper periphery for engaging with the inwardly-retracted flange (84) of the outer auxiliary (83) for second force-receiving structure thereby preventing disengagement;

When the pressure between the carrying end (4) and the terminal support body (5) contacted by the contact structure (7) having lower friction damping is smaller than a set value, the contact structure (8) having higher friction damping of the second force-receiving structure (2), does not contact the terminal support body (5);

When the pressure between the carrying end (4) and the terminal support body (5) contacted by the contact structure (7) having lower friction damping is greater than the set value, the semi-spherical terminal block (70a) is pressured and displaced, so the contact structure (7) having lower friction damping and the contact structure (8) having higher friction damping of the second force-receiving structure (2) jointly contact the terminal support body (5).

The structure disclosed by FIG. 19 except for being constructed by combining the foregoing individual parts, it may alternatively being constructed by combining the first force-receiving structure (1), the pre-stressed structure (3), and the assembled auxiliary (81) for the second force-receiving structure first, and then combining the resulting assembly with the second force-receiving structure (2);

FIG. 21 schematically shows one embodiment of the assembled structure of FIG. 19.

As shown in FIG. 21, it primarily comprises the following components:

the first force-receiving structure (1);

the second force-receiving structure (2);

the assembled auxiliary (81) for the second force-receiving structure: being installed at one end of the second force-receiving structure (2) close to the terminal support body (5), the assembled auxiliary (81) for the second force-receiving structure having its structural end facing the terminal support body (5) provided with a flange (82), the flange (82) having its end facing the terminal support body (5) provided with a contact structure (8) having higher friction damping, the inner space of the assembled auxiliary (81) for the second force-receiving structure at its end facing the terminal support body (5) being provided with the first force-receiving structure (1) having the semi-spherical terminal block (70a), and at where between the semi-spherical terminal block (70a) and the inner space of the assembled auxiliary (81) for the second force-receiving structure at its end facing the limiting structure (11) is provided with a pre-stressed structure (3) constructed from a magnetic pre-stressed device (31); wherein the foregoing assembled auxiliary (81) for the second force-receiving structure and the second force-receiving structure (2) may be combined in one or more ways of:

1) the two being combined by means of press-fit insertion;
2) the two being combined by means of mating spiral structures;
3) the two being fastened by laterally passing through pins;
4) the two being fastened by laterally installed screws;
5) the two being welded together; and
6) the two being bonded together; and the magnetic pre-stressed device (31): including permanent magnets that are such arranged between the limiting structure (11) extended from and linked to the second force-receiving structure (2) and the first force-receiving structure (1) having the semi-spherical terminal block (70a) that they face each other with the same polarity so as to have mutual repellence;

Therein the semi-spherical terminal block (70a) of the first force-receiving structure (1) is of a semi-spherical structure, with its slower side having a spherical projecting end facing the terminal support body (5) constructed as a contact structure (7) having lower friction damping, and with its upper end provided with the permanent magnet composing the magnetic pre-stressed device (31), an outward-expanding annular flange structure (70b) is provided at its upper periphery for engaging with the inwardly-retracted flange (84) of the flange (82) of the assembled auxiliary (81) for the second force-receiving structure thereby preventing disengagement;

When the pressure between the carrying end (4) and the terminal support body (5) contacted by the contact structure (7) having lower friction damping of the semi-spherical terminal block (70a) is smaller than a set value, the contact structure (8) having higher friction damping of the second force-receiving structure (2) does not contact the terminal support body (5);

When the pressure between the carrying end (4) and the terminal support body (5) contacted by the contact structure (7) having lower friction damping of the semi-spherical terminal block (70a) is greater than the set value, the semi-spherical terminal block (70a) is pressured and displaced, so the contact structure (7) having lower friction damping and the contact structure (8) having higher friction damping of the second force-receiving structure (2) jointly contact the terminal support body (5).

In the embodiments depicted in FIGS. 19, 20 and 21, the semi-spherical terminal block (70a) and the outward-expanding annular flange structure (70b) may be constructed from a semi-spherical cup-shaped structure (70c), the semi-spherical cup-shaped structure (70c) has an outwardly-extended annular sheet (70d), the foregoing semi-spherical cup-shaped structure (70c) may be used instead of the semi-spherical terminal block (70a), and the outwardly-extended annular sheet (70d) can be in place of the outward-expanding annular flange structure (70b) at the upper periphery of the semi-spherical terminal block (70a).

FIG. 22 schematically shows one embodiment of the structure of FIG. 19, wherein the semi-spherical terminal block (70a) is replaced with a semi-spherical cup-shaped structure (70c).

FIG. 23 schematically shows one embodiment of the present invention constructed from a spiral spring pre-stressed device (33) and a semi-spherical terminal block (70a).

FIG. 24 is a schematic cross-sectional view of the structure of FIG. 23 taken along Line A-A.

As shown in FIGS. 23 and 24, it primarily comprises the following components:
  the first force-receiving structure (1): being constructed from a semi-spherical terminal block (70a) that is capable of shifting in the inner space of the second force-receiving structure (2), a pre-stressed structure (3) constructed from a spiral spring pre-stressed device (33) being provided between one end of the first force-receiving structure (1) and the limiting structure (11) extended from and linked to the second force-receiving structure (2), a contact structure (7) having lower friction damping being provided at an opposite end of the semi-spherical terminal block (70a);
  the second force-receiving structure (2): being constructed from materials and structures having sufficient strength and supporting capability, having one end thereof combined with the carrying end (4), and a pre-stressed structure (3) constructed from a spiral spring pre-stressed device (33) being provided between the limiting structure (11) extended from and linked to the second force-receiving structure (2) and the first force-receiving structure (1) having the semi-spherical terminal block (70a);
  the spiral spring pre-stressed device (33): being constructed from a coil-shaped spiral spring, and installed between the limiting structure (11) extended from and linked to the second force-receiving structure (2) and the first force-receiving structure (1) having the semi-spherical terminal block (70a), wherein the tension generated when the spiral spring is pressed allows it to function as the pre-stressed structure (3); and
  the outer auxiliary (83) for second force-receiving structure: being a tubular structure made of materials and structures having sufficient strength and supporting capability, having one end thereof combined with the outer periphery of the second force-receiving structure (2), and having an opposite end thereof provided with a contact structure (8) having higher friction damping and an inwardly-retracted flange (84), and the outer auxiliary (83) for second force-receiving structure and the second force-receiving structure (2) being combined by means of screwed structures or interference fit or fit that is followed by pin fixing.

Therein the semi-spherical terminal block (70a) of the first force-receiving structure (1) is of a semi-spherical structure, with its slower side having a spherical projecting end facing the terminal support body (5) constructed as a contact structure (7) having lower friction damping, and with its upper end provided with the spiral spring pre-stressed device (33), an outward-expanding annular flange structure (70b) is provided at its upper periphery for engaging with the inwardly-retracted flange (84) of the outer auxiliary (83) for second force-receiving structure thereby preventing disengagement;

When the pressure between the carrying end (4) and the terminal support body (5) contacted by the contact structure (7) having lower friction damping is smaller than a set value, the contact structure (8) having higher friction damping of the second force-receiving structure (2), does not contact the terminal support body (5);

When the pressure between the carrying end (4) and the terminal support body (5) contacted by the contact structure (7) having lower friction damping is greater than the set value, the semi-spherical terminal block (70a) is pressured and displaced, so the contact structure (7) having lower friction damping and the contact structure (8) having higher friction damping of the second force-receiving structure (2) jointly contact the terminal support body (5).

The structure disclosed by FIG. 23 except for being constructed by combining the foregoing individual parts, it may alternatively being constructed by combining the first force-receiving structure (1), the pre-stressed structure (3), and the assembled auxiliary (81) for the second force-receiving structure first, and then combining the resulting assembly with the second force-receiving structure (2);

FIG. 25 schematically shows one embodiment of the assembled structure of FIG. 23.

As shown in FIG. 25, it primarily comprises the following components:
  the first force-receiving structure (1);
  the second force-receiving structure (2);
    the assembled auxiliary (81) for the second force-receiving structure: being installed at one end of the second force-receiving structure (2) close to the terminal support body (5), the assembled auxiliary (81) for the second force-receiving structure having its structural end facing the terminal support body (5)

provided with a flange (82), the flange (82) having its end facing the terminal support body (5) provided with a contact structure (8) having higher friction damping, the inner space of the assembled auxiliary (81) for the second force-receiving structure at its end facing the terminal support body (5) being provided with the first force-receiving structure (1) having the semi-spherical terminal block (70a), and at where between the semi-spherical terminal block (70a) and the inner space of the assembled auxiliary (81) for the second force-receiving structure at its end facing the limiting structure (11) is provided with a pre-stressed structure (3) constructed from a spiral spring pre-stressed device (33); wherein the foregoing assembled auxiliary (81) for the second force-receiving structure and the second force-receiving structure (2) may be combined in one or more ways of:

1) the two being combined by means of press-fit insertion;
2) the two being combined by means of mating spiral structures;
3) the two being fastened by laterally passing through pins;
4) the two being fastened by laterally installed screws;
5) the two being welded together; and
6) the two being bonded together; and the spiral spring pre-stressed device (33): being constructed from a coil-shaped spiral spring, and installed between the limiting structure (11) extended from and linked to the second force-receiving structure (2) and the first force-receiving structure (1) having the semi-spherical terminal block (70a), wherein the tension generated when the spiral spring is pressed allows it to function as the pre-stressed structure (3);

Therein the semi-spherical terminal block (70a) of the first force-receiving structure (1) is of a semi-spherical structure, with its slower side having a spherical projecting end facing the terminal support body (5) constructed as a contact structure (7) having lower friction damping, and with its upper end provided with the spiral spring pre-stressed device (33), an outward-expanding annular flange structure (70b) is provided at its upper periphery for engaging with the inwardly-retracted flange (84) of the flange (82) of the assembled auxiliary (81) for the second force-receiving structure thereby preventing disengagement;

When the pressure between the carrying end (4) and the terminal support body (5) contacted by the contact structure (7) having lower friction damping of the semi-spherical terminal block (70a) is smaller than a set value, the contact structure (8) having higher friction damping of the second force-receiving structure (2) does not contact the terminal support body (5);

When the pressure between the carrying end (4) and the terminal support body (5) contacted by the contact structure (7) having lower friction damping of the semi-spherical terminal block (70a) is greater than the set value, the semi-spherical terminal block (70a) is pressured and displaced, so the contact structure (7) having lower friction damping and the contact structure (8) having higher friction damping of the second force-receiving structure (2) jointly contact the terminal support body (5).

In the embodiments depicted in FIGS. 23, 24 and 25, the semi-spherical terminal block (70a) and the outward-expanding annular flange structure (70b) may be constructed from a semi-spherical cup-shaped structure (70c), the semi-spherical cup-shaped structure (70c) has an outwardly-extended annular sheet (70d), the foregoing semi-spherical cup-shaped structure (70c) may be used instead of the semi-spherical terminal block (70a), and the outwardly-extended annular sheet (70d) can be in place of the outward-expanding annular flange structure (70b) at the upper periphery of the semi-spherical terminal block (70a).

FIG. 26 schematically shows one embodiment wherein the semi-spherical terminal block (70a) of FIG. 23 is replaced with a semi-spherical cup-shaped structure (70c).

FIG. 27 schematically shows one embodiment of the present invention constructed from a spiral spring pre-stressed device (33) and a terminal block (71) having lower friction damping.

FIG. 28 is a schematic cross-sectional view of the structure of FIG. 27 taken along Line A-A.

As shown in FIGS. 27 and 28, it primarily comprises the following components:

the first force-receiving structure (1): being constructed from a terminal block (71) having lower friction damping that is capable of shifting in an inner space of the second force-receiving structure (2), a pre-stressed structure (3) constructed from a spiral spring pre-stressed device (33) being provided between one end of the first force-receiving structure (1) and the limiting structure (11) extended from and linked to the second force-receiving structure (2), and a contact structure (7) having lower friction damping being provided at an opposite end of the first force-receiving structure (1) and facing the terminal support body (5);

the second force-receiving structure (2): being constructed from materials and structures having sufficient strength and supporting capability, having one end thereof combined with the carrying end (4), and having an opposite end thereof provided with a contact structure (8) having higher friction damping, and a pre-stressed structure (3) constructed from a spiral spring pre-stressed device (33) being provided between the limiting structure (11) extended from and linked to the second force-receiving structure (2) and the first force-receiving structure (1) having the terminal block (71) having lower friction damping; and the spiral spring pre-stressed device (33): being constructed from a coil-shaped spiral spring, with two ends located between the limiting structure (11) extended from and linked to the second force-receiving structure (2) and the terminal block (71) having lower friction damping of the first force-receiving structure (1), wherein the elasticity of the spiral spring allows it to function as the spiral spring pre-stressed device (33);

An axial displacement limiting device is provided between the first force-receiving structure (1) and the second force-receiving structure (2) for preventing the terminal block (71) having lower friction damping of the first force-receiving structure (1) from departing from the second force-receiving structure (2); in the present embodiment, the axial displacement limiting structure is realized by screwing two ends of a spiral spring pre-stressed device (33) with a recess (331) at the limiting structure (11) extended from and linked to the second force-receiving structure (2) and a recess (332) at the upper part of the terminal block (71) having lower friction damping, respectively, for preventing the terminal block (71) having lower friction damping from departing from the second force-receiving structure (2), the foregoing limiting structure for preventing both the first force-receiving structure (1) and the terminal block (71) from coining off is merely one example, alternatively, it may be realized by a guide slot (731) passing through the first force-receiving structure (1) and a pin (721) of the second force-receiving structure (2), as described in the embodiment shown in FIG. 5 and FIG. 6; moreover, for preventing the terminal block (71) having lower friction damping from coining off, alternative structures that have the same limiting capability may be used instead.

The structure disclosed in FIG. 27 except for being constructed by combining the foregoing individual parts, it may alternatively being constructed by combining the first force-receiving structure (1), the pre-stressed structure (3), and the assembled auxiliary (81) for the second force-receiving structure first, and then combining the resulting assembly with the second force-receiving structure (2);

FIG. 29 schematically shows one embodiment of the assembled structure of FIG. 27.

As shown in FIG. 29, it primarily comprises the following components:

the first force-receiving structure (1);
the second force-receiving structure (2);
    the assembled auxiliary (81) for the second force-receiving structure: being installed at one end of the second force-receiving structure (2) close to the terminal support body (5), the assembled auxiliary (81) for the second force-receiving structure having its structural end facing the terminal support body (5) provided with a flange (82), the flange (82) having its one end facing the terminal support body (5) provided with a contact structure (8) having higher friction damping, the first force-receiving structure (1) having terminal block (71) having lower friction damping being installed in the inner space of the assembled auxiliary (81) for the second force-receiving structure, and a pre-stressed structure (3) constructed from a spiral spring pre-stressed device (33) being provided at where between the upper end of the terminal block (71) having lower friction damping and one end of the inner space of the assembled auxiliary (81) for the second force-receiving structure facing the limiting structure (11); wherein the foregoing assembled auxiliary (81) for the second force-receiving structure and the second force-receiving structure (2) may be combined in one or more ways of:
    1) the two being combined by means of press-fit insertion;
    2) the two being combined by means of mating spiral structures;
    3) the two being fastened by laterally passing through pins;
    4) the two being fastened by laterally installed screws;
    5) the two being welded together; and
    6) the two being bonded together; and
    the spiral spring pre-stressed device (33): being constructed from a coil-shaped spiral spring, with its two ends received in a recess (331) of a limiting structure (11) at the top of the inner space of the assembled auxiliary (81) for the second force-receiving structure and a recess (332) at the upper end of the terminal block (71) having lower friction damping, respectively;

An axial displacement limiting structure is provided between the first force-receiving structure (1) and the flange (82) of the assembled auxiliary (81) for the second force-receiving structure for preventing the first force-receiving structure (1) from departing from the assembled auxiliary (81) for the second force-receiving structure; in the present embodiment, the axial displacement limiting structure is realized by screwing two ends of a spiral spring pre-stressed device (33) with a recess (331) of the limiting structure (11) of the second force-receiving structure (2) and a recess (332) at the upper part of the terminal block (71) having lower friction damping, respectively, for preventing the terminal block (71) having lower friction damping from departing from the second force-receiving structure (2), the foregoing limiting structure for preventing both the first force-receiving structure (1) and the terminal block (71) from coining off is merely one example, alternatively, it may be realized by a guide slot (731) passing through the first force-receiving structure (1) and a pin (721) of the assembled auxiliary (81) for the second force-receiving structure, as described in the embodiment shown in FIG. 7; also, alternative structures that have the same limiting capability may be used instead.

FIG. 30 schematically shows one embodiment of the present invention constructed from a spiral spring pre-stressed device (33) and a rolling ball (73).

FIG. 31 is a bottom view according to FIG. 30.

As shown in FIGS. 30 and 31, it primarily comprises the following components:

the first force-receiving structure (1): being constructed from a rolling ball (73) that is capable of shifting along the inner space of the outer auxiliary (83) for second force-receiving structure, and a spiral spring pre-stressed device (33) being provided between one end of the rolling ball (73) and the limiting structure (11) extended from and linked to the second force-receiving structure (2);

the second force-receiving structure (2): being constructed from materials and structures having sufficient strength and supporting capability, having one end thereof combined with the carrying end (4), and the spiral spring pre-stressed device (33) being provided between the limiting structure (11) extended from and linked to the second force-receiving structure (2) and the rolling ball (73);

the spiral spring pre-stressed device (33): being constructed from a coil-shaped spiral spring, and installed between the limiting structure (11) extended from and linked to the second force-receiving structure (2) and the rolling ball (73), wherein the tension generated when the spiral spring is compressed allows it to function as a pre-stressed structure (3); and the outer auxiliary (83) for second force-receiving structure: being a tubular structure made of materials and structures having sufficient strength and supporting capability, having one end thereof combined with the outer periphery of the second force-receiving structure (2), and having an opposite end thereof provided with a contact structure (8) having higher friction damping and an inwardly-retracted flange (84) that annularly concaved and forming upward the inner space of the outer auxiliary (83) for second force-receiving structure, and the outer auxiliary (83) for second force-receiving structure and the second force-receiving structure (2) being combined by means of screwed structures or interference fit or fit that is followed by pin fixing.

Therein, the rolling ball (73) of the first force-receiving structure (1) is of a spherical structure, the spiral spring pre-stressed device (33) is installed at the upper side of the rolling ball (73), and the rolling ball (73) is limited by the inwardly-retracted flange (84) of the outer auxiliary (83) for second force-receiving structure for preventing it from coining off;

When the pressure between the carrying end (4) and the terminal support body (5) that is contacted by the rolling ball (73) is smaller than a set value, the contact structure (8)

having higher friction damping of the second force-receiving structure (2) does not contact the terminal support body (5);

When the pressure between the carrying end (4) and the terminal support body (5) that is contacted by the rolling ball (73) is greater than the set value, the rolling ball (73) now pressured and displaced, so that jointly with the contact structure (8) having higher friction damping of the second force-receiving structure (2) contact the terminal support body (5).

The structure disclosed by FIG. 30 except for being constructed by combining the foregoing individual parts, it may alternatively being constructed by combining the first force-receiving structure (1), the pre-stressed structure (3), and the assembled auxiliary (81) for the second force-receiving structure first, and then combining the resulting assembly with the second force-receiving structure (2);

FIG. 32 schematically shows one embodiment of the assembled structure of FIG. 30.

As shown in FIG. 32, it primarily comprises the following components:

the first force-receiving structure (1);
the second force-receiving structure (2);
 the assembled auxiliary (81) for the second force-receiving structure: being installed at one end of the second force-receiving structure (2) close to the terminal support body (5), the assembled auxiliary (81) for the second force-receiving structure having its structural end facing the terminal support body (5) provided with a flange (82), the flange (82) having its end facing the terminal support body (5) provided with a contact structure (8) having higher friction damping, an intermediate assembling member (810) of second force-receiving structure being provided between the assembled auxiliary (81) for the second force-receiving structure and the second force-receiving structure (2), the assembled auxiliary (81) for the second force-receiving structure having its one end combined with the intermediate assembling member (810) of second force-receiving structure, and having its opposite end facing the terminal support body (5) provided with an inwardly-retracted flange (84) that is annularly concaved and forming upward the inner space of the assembled auxiliary (81) for the second force-receiving structure, a rolling ball (73) being installed at one end of the inner space facing the terminal support body (5), the inwardly-retracted flange (84) providing limitation that prevents the rolling ball (73) from coining off, and a pre-stressed structure (3) constructed from a spiral spring pre-stressed device (33) being provided at one end of the rolling ball (73) facing the limiting structure (11); wherein the foregoing assembled auxiliary (81) for the second force-receiving structure and the second force-receiving structure (2) may be combined in one or more ways of:
1) the two being combined by means of press-fit insertion;
2) the two being combined by means of mating spiral structures;
3) the two being fastened by laterally passing through pins;
4) the two being fastened by laterally installed screws;
5) the two being welded together; and
6) the two being bonded together; and
the spiral spring pre-stressed device (33): being constructed from a coil-shaped spiral spring, installed between the limiting structure (11) of the intermediate assembling member (810) of second force-receiving structure and the first force-receiving structure (1) constructed from a rolling ball (73), wherein the tension generated when the spiral spring is compressed allows it to function as a pre-stressed structure (3);

When the pressure between the carrying end (4) and the terminal support body (5) that is contacted by the rolling ball (73) is smaller than a set value, the contact structure (8) having higher friction damping of the second force-receiving structure (2) does not contact the terminal support body (5);

When the pressure between the carrying end (4) and the terminal support body (5) that is contacted by the rolling ball (73) is greater than the set value, the rolling ball (73) now pressured and displaced, so that jointly with the contact structure (8) having higher friction damping of the second force-receiving structure (2) contact the terminal support body (5).

FIG. 33 schematically shows one embodiment of the present invention constructed from a spiral spring pre-stressed device (33), an intermediate pad (735), and a rolling ball (73).

FIG. 34 is a bottom view according to FIG. 33.

As shown in FIGS. 33 and 34, it primarily comprises the following components:

the first force-receiving structure (1): being constructed from a rolling ball (73) that is capable of shifting along the inner space of the outer auxiliary (83) for second force-receiving structure, and an intermediate pad (735) and a spiral spring pre-stressed device (33) being provided between one end of the rolling ball (73) and the limiting structure (11) extended from and linked to the second force-receiving structure (2);

the second force-receiving structure (2): being constructed from materials and structures having sufficient strength and supporting capability, having one end thereof combined with the carrying end (4), and a spiral spring pre-stressed device (33) and an intermediate pad (735) being provided between the limiting structure (11) extended from and linked to the second force-receiving structure (2) and the rolling ball (73) to form the pre-stressed structure (3);

the spiral spring pre-stressed device (33): being constructed from a coil-shaped spiral spring, and installed between the limiting structure (11) extended from and linked to the second force-receiving structure (2) and the rolling ball (73), wherein the tension generated when the spiral spring is pressed allows it to function as the pre-stressed structure (3), and an intermediate pad (735) being provided between the rolling ball (73) and the spiral spring pre-stressed device (33); and the outer auxiliary (83) for second force-receiving structure: being a tubular structure made of materials and structures having sufficient strength and supporting capability, having one end thereof combined with the outer periphery of the second force-receiving structure (2), and having an opposite end thereof provided with a contact structure (8) having higher friction damping and an inwardly-retracted flange (84) that is annularly concaved and forming upward the inner space of the outer auxiliary (83) for second force-receiving structure, and the outer auxiliary (83) for second force-receiving structure and the second force-receiving structure (2) being combined by means of screwed structures or interference fit or fit that is followed by pin fixing.

Therein, the rolling ball (73) of the first force-receiving structure (1) is of a spherical structure, an intermediate pad (735) is provided at the upper side of the rolling ball (73), and the spiral spring pre-stressed device (33) is installed thereon; the rolling ball (73) is limited by the inwardly-retracted flange (84) of the outer auxiliary (83) for second force-receiving structure, for preventing it from coining off;

When the pressure between the carrying end (4) and the terminal support body (5) that is contacted by the rolling ball (73) is smaller than a set value, the contact structure (8) having higher friction damping of the second force-receiving structure (2) does not contact the terminal support body (5);

When the pressure between the carrying end (4) and the terminal support body (5) that is contacted by the rolling ball (73) is greater than the set value, the rolling ball (73) now pressured and displaced, so that jointly with the contact structure (8) having higher friction damping of the second force-receiving structure (2) contact the terminal support body (5).

The structure disclosed by FIG. 33 except for being constructed by combining the foregoing individual parts, it may alternatively being constructed by combining the first force-receiving structure (1), the pre-stressed structure (3), and the assembled auxiliary (81) for the second force-receiving structure first, and then combining the resulting assembly with the second force-receiving structure (2);

FIG. 35 schematically shows one embodiment of the assembled structure of FIG. 33.

As shown in FIG. 35, it primarily comprises the following components:

the first force-receiving structure (1);
the second force-receiving structure (2);
the assembled auxiliary (81) for the second force-receiving structure: being installed at one end of the second force-receiving structure (2) close to the terminal support body (5), the assembled auxiliary (81) for the second force-receiving structure having its structural end facing the terminal support body (5) provided with a flange (82), the flange (82) having its end facing the terminal support body (5) provided with a contact structure (8) having higher friction damping, an intermediate assembling member (810) of second force-receiving structure being provided between the assembled auxiliary (81) for the second force-receiving structure and the second force-receiving structure (2), the assembled auxiliary (81) for the second force-receiving structure having its one end combined with the intermediate assembling member (810) of second force-receiving structure, and having its opposite end facing the terminal support body (5) provided with an inwardly-retracted flange (84) that is annularly concaved and forming upward the inner space of the assembled auxiliary (81) for the second force-receiving structure, a rolling ball (73) being installed at one end of the inner space facing the terminal support body (5), the inwardly-retracted flange (84) providing limitation that prevents the rolling ball (73) from coining off, and an intermediate pad (735) and a pre-stressed structure (3) constructed from a spiral spring pre-stressed device (33) being provided at one end of the rolling ball (73) facing the limiting structure (11); wherein the foregoing assembled auxiliary (81) for the second force-receiving structure and the second force-receiving structure (2) may be combined in one or more ways of:
1) the two being combined by means of press-fit insertion;
2) the two being combined by means of mating spiral structures;
3) the two being fastened by laterally passing through pins;
4) the two being fastened by laterally installed screws;
5) the two being welded together; and
6) the two being bonded together; and
the spiral spring pre-stressed device (33): being constructed from a coil-shaped spiral spring, and installed between the limiting structure (11) of the intermediate assembling member (810) of second force-receiving structure and the first force-receiving structure (1) constructed from the intermediate pad (735) and the rolling ball (73), wherein the tension generated when the spiral spring is compressed allows it to function as a pre-stressed structure (3);

When the pressure between the carrying end (4) and the terminal support body (5) that is contacted by the rolling ball (73) is smaller than a set value, the contact structure (8) having higher friction damping of the second force-receiving structure (2) does not contact the terminal support body (5);

When the pressure between the carrying end (4) and the terminal support body (5) that is contacted by the rolling ball (73) is greater than the set value, the rolling ball (73) now pressured and displaced, so that jointly with the contact structure (8) having higher friction damping of the second force-receiving structure (2) contact the terminal support body (5).

Figure 36:
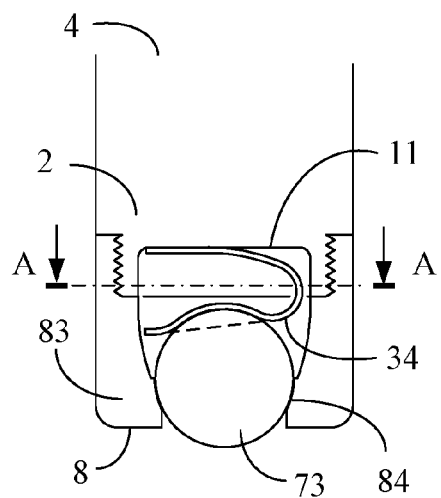
FIG. 36 schematically shows one embodiment of the present invention constructed from a U-shaped leaf spring (34) with a concaved contact surface and a rolling ball (73).

FIG. 36 schematically shows one embodiment of the present invention constructed from a U-shaped leaf spring (34) with a concaved contact surface and a rolling ball (73).

Figure 37:
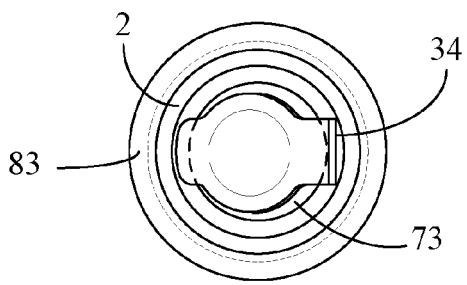
FIG. 37 is a schematic cross-sectional view of the structure of FIG. 36 taken along Line A-A.

FIG. 37 is a schematic cross-sectional view of the structure of FIG. 36 taken along Line A-A.

As shown in FIGS. 36 and 37, it primarily comprises the following components:

the first force-receiving structure (1): being constructed from a rolling ball (73) that is capable of shifting along the inner space of the outer auxiliary (83) for second force-receiving structure, and a pre-stressed structure (3) constructed from the U-shaped leaf spring (34) with a concaved contact surface being provided between one end of the rolling ball (73) and the limiting structure (11) extended from and linked to the second force-receiving structure (2);
the second force-receiving structure (2): being constructed from materials and structures having sufficient strength and supporting capability, having one end thereof combined with the carrying end (4), and a U-shaped leaf spring (34) with a concaved contact surface being provided between the limiting structure (11) extended from and linked to the second force-receiving structure (2) and the rolling ball (73);
the U-shaped leaf spring (34) with a concaved contact surface: being constructed from a spring plate in a U-like shape, and installed between the limiting structure (11) extended from and linked to the second force-receiving structure (2) and the rolling ball (73), the U-shaped leaf spring (34) having a surface contacting the rolling ball (73) that is slightly spherically concaved, wherein the tension generated when the U-shaped spring plate is compressed allows it to function as a pre-stressed structure (3); and the outer auxiliary (83) for second force-receiving structure: being a tubular structure made of materials and structures having sufficient strength and supporting capability, having one end thereof combined with the outer periphery of the second force-receiving structure (2), and having an opposite end thereof provided with a contact structure (8) having higher friction damping and an inwardly-retracted flange (84) that annularly concaved and forming upward the inner space of the outer auxiliary (83) for second force-receiving structure, and the outer auxiliary (83) for second force-receiving structure and the second force-receiving structure (2) being combined by means of screwed structures or interference fit or fit that is followed by pin fixing.

Therein, the rolling ball (73) of the first force-receiving structure (1) is of a spherical structure, the rolling ball (73) at its upper side is provided with a U-shaped leaf spring (34) with a concaved contact surface, and the rolling ball (73) is limited by the inwardly-retracted flange (84) of the outer auxiliary (83) for second force-receiving structure, for preventing it from coining off;

When the pressure between the carrying end (4) and the terminal support body (5) that is contacted by the rolling ball (73) is smaller than a set value, the contact structure (8) having higher friction damping of the second force-receiving structure (2) does not contact the terminal support body (5);

When the pressure between the carrying end (4) and the terminal support body (5) that is contacted by the rolling ball (73) is greater than the set value, the rolling ball (73) now pressured and displaced, so that jointly with the contact structure (8) having higher friction damping of the second force-receiving structure (2) contact the terminal support body (5).

Figure 38:
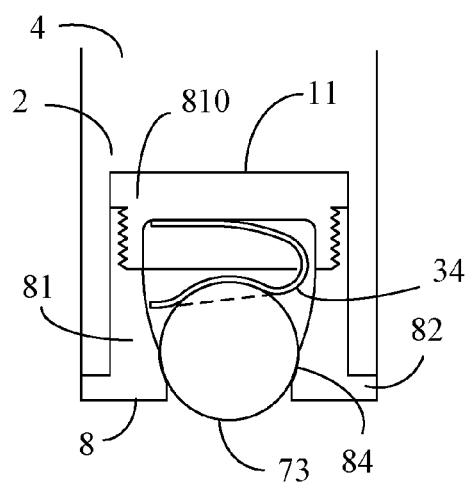
FIG. 38 schematically shows one embodiment of the assembled structure of FIG. 36.

The structure disclosed by FIG. 36 except for being constructed by combining the foregoing individual parts, it may alternatively being constructed by combining the first force-receiving structure (1), the pre-stressed structure (3), and the assembled auxiliary (81) for the second force-receiving structure first, and then combining the resulting assembly with the second force-receiving structure (2);

FIG. 38 schematically shows one embodiment of the assembled structure of FIG. 36.

As shown in FIG. 38, it primarily comprises the following components:

the first force-receiving structure (1);
the second force-receiving structure (2);
the assembled auxiliary (81) for the second force-receiving structure: being installed at one end of the second force-receiving structure (2) close to the terminal support body (5), the assembled auxiliary (81) for the second force-receiving structure having its structural end facing the terminal support body (5) provided with a flange (82), the flange (82) having its end facing the terminal support body (5) provided with a contact structure (8) having higher friction damping, an intermediate assembling member (810) of second force-receiving structure being provided between the assembled auxiliary (81) for the second force-receiving structure and the second force-receiving structure (2), the assembled auxiliary (81) for the second force-receiving structure having its one end combined with the intermediate assembling member (810) of second force-receiving structure, and having its opposite end facing the terminal support body (5) provided with an inwardly-retracted flange (84) that is annularly concaved and forming upward the inner space of assembled auxiliary (81) for the second force-receiving structure, a rolling ball (73) being installed at one end of the inner space facing the terminal support body (5), the inwardly-retracted flange (84) providing limitation that prevents the rolling ball (73) from coining off, and a pre-stressed structure (3) constructed from the U-shaped leaf spring (34) with a concaved contact surface being provided at one end of the rolling ball (73) facing the limiting structure (11); wherein the foregoing assembled auxiliary (81) for the second force-receiving structure and the second force-receiving structure (2) may be combined in one or more ways of:

1) the two being combined by means of press-fit insertion;
2) the two being combined by means of mating spiral structures;
3) the two being fastened by laterally passing through pins;
4) the two being fastened by laterally installed screws;
5) the two being welded together; and
6) the two being bonded together; and the U-shaped leaf spring (34) with a concaved contact surface: being constructed from a spring plate in a U-like shape, and installed between the limiting structure (11) of the intermediate assembling member (810) of second force-receiving structure and the first force-receiving structure (1) having the rolling ball (73), the U-shaped leaf spring (34) having a surface contacting the rolling ball (73) that is slightly spherically concaved, wherein the tension generated when the U-shaped spring plate is compressed allows it to function as a pre-stressed structure (3);

When the pressure between the carrying end (4) and the terminal support body (5) that is contacted by the rolling ball (73) is smaller than a set value, the contact structure (8) having higher friction damping of the second force-receiving structure (2) does not contact the terminal support body (5);

When the pressure between the carrying end (4) and the terminal support body (5) that is contacted by the rolling ball (73) is greater than the set value, the rolling ball (73) now pressured and displaced, so that jointly with the contact structure (8) having higher friction damping of the second force-receiving structure (2) contact the terminal support body (5).

FIG. 39 schematically shows one embodiment of the present invention constructed from an elastic material pre-stressed device (32) and a terminal block (71) having lower friction damping.

FIG. 40 is a bottom view according to FIG. 39.

As shown in FIGS. 39 and 40, it primarily comprises the following components:

the first force-receiving structure (1): being constructed from a terminal block (71) having lower friction damping that is capable of shifting along an inner space of the second force-receiving structure (2), a pre-stressed structure (3) constructed from an elastic material pre-stressed device (32) being provided between one end of the first force-receiving structure (1) and the limiting structure (11) extended from and linked to the second force-receiving structure (2), the first force-receiving structure (1) having an opposite end thereof provided with a contact structure (7) having lower friction damping facing the terminal support body (5);

the second force-receiving structure (2): being constructed from materials and structures having sufficient strength and supporting capability, having one end thereof combined with the carrying end (4), and having an opposite end thereof provided with a contact structure (8) having higher friction damping, and a pre-stressed structure (3) constructed from an elastic material pre-stressed device (32) being provided between the limiting structure (11) extended from and linked to the second force-receiving structure (2) and the first force-receiving structure (1) having the terminal block (71) having lower friction damping; and the elastic material pre-stressed device (32): being a pre-stressed device constructed from an elastic material, with its two ends received in a recess (331) of the limiting structure (11) and a recess (332) of the terminal block (71) having lower friction damping, respectively;

An axial displacement limiting device is provided between the first force-receiving structure (1) and the second force-receiving structure (2) for preventing the terminal block (71) having lower friction damping of the first force-receiving structure (1) from departing from the second force-receiving structure (2); in the present embodiment, the axial displacement limiting structure is realized by screwing two ends of an elastic material pre-stressed device (32) with a recess (331) at the limiting structure (11) and a recess (332) at the upper part of the terminal block (71) having lower friction damping, respectively, for preventing the terminal block (71) having lower friction damping from departing from the second force-receiving structure (2); the foregoing limiting structure for preventing both the first force-receiving structure (1) and the terminal block (71) having lower friction damping from coining off is merely one example, alternatively, it may be realized by a guide slot (731) passing through the first force-receiving structure (1) and a pin (721) of the second force-receiving structure (2), as described in the embodiment shown in FIG. 5 and FIG. 6; moreover, for preventing the terminal block (71) having lower friction damping from coining off, alternative structures that have the same limiting capability may be used instead.

The structure disclosed in FIG. 39 except for being constructed by combining the foregoing individual parts, it my alternatively being constructed by combining the first force-receiving structure (1), the pre-stressed structure (3), and the assembled auxiliary (81) for the second force-receiving structure first, and then combining the resulting assembly with the second force-receiving structure (2);

FIG. 41 schematically shows one embodiment of the assembled structure of FIG. 39.

As shown in FIG. 41, it primarily comprises the following components:

the first force-receiving structure (1);
the second force-receiving structure (2);
the assembled auxiliary (81) for the second force-receiving structure: being installed at one end of the second force-receiving structure (2) close to the terminal support body (5), the assembled auxiliary (81) for the second force-receiving structure having its structural end facing the terminal support body (5) provided with a flange (82), the flange (82) having its one end facing the terminal support body (5) provided with a contact structure (8) having higher friction damping, the first force-receiving structure (1) having terminal block (71) having lower friction damping being installed in the inner space of the assembled auxiliary (81) for the second force-receiving structure, and a pre-stressed structure (3) constructed from an elastic material pre-stressed device (32) being provided at where between the upper end of the terminal block (71) having lower friction damping and one end of the inner space of the assembled auxiliary (81) for the second force-receiving structure facing the limiting structure (11); wherein the foregoing assembled auxiliary (81) for the second force-receiving structure and the second force-receiving structure (2) may be combined in one or more ways of:

1) the two being combined by means of press-fit insertion;
2) the two being combined by means of mating spiral structures;
3) the two being fastened by laterally passing through pins;
4) the two being fastened by laterally installed screws;
5) the two being welded together; and
6) the two being bonded together; and elastic material pre-stressed device (32): being a pre-stressed device constructed from an elastic material, with its two ends received in a recess (331) of the limiting structure (11) at the top of the inner space of the assembled auxiliary (81) for the second force-receiving structure and a recess (332) at the terminal block (71) having lower friction damping upper end, respectively;

An axial displacement limiting structure is provided between the first force-receiving structure (1) and the flange (82) of the assembled auxiliary (81) for the second force-receiving structure for preventing the first force-receiving structure (1) from departing from the assembled auxiliary (81) for the second force-receiving structure; in the present embodiment, the axial displacement limiting structure is realized by screwing two ends of an elastic material pre-stress device (32) with a recess (331) of the limiting structure (11) of the second force-receiving structure (2) and a recess (332) at the upper part of the terminal block (71) having lower friction damping, respectively, for preventing the terminal block (71) having lower friction damping from departing from the second force-receiving structure (2), the foregoing limiting structure for preventing both the first force-receiving structure (1) and the terminal block (71) from coining off is merely one example, Alternatively, it may be realized by a guide slot (731) passing through the first force-receiving structure (1) and a pin (721) of the assembled auxiliary (81) for the second force-receiving structure, as described in the embodiment shown in FIG. 7; also, alternative structures that have the same limiting capability may be used instead.

Figure 42:
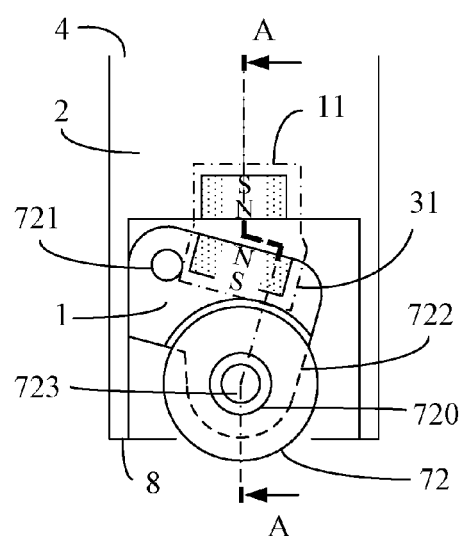
FIG. 42 schematically shows one embodiment of the present invention constructed from a magnetic pre-stressed device (31) and a rolling wheel (72), which is of a one-side swinging structure.

FIG. 42 schematically shows one embodiment of the present invention constructed from a magnetic pre-stressed device (31) and a rolling wheel (72), which is of a one-side swinging structure.

Figure 43:
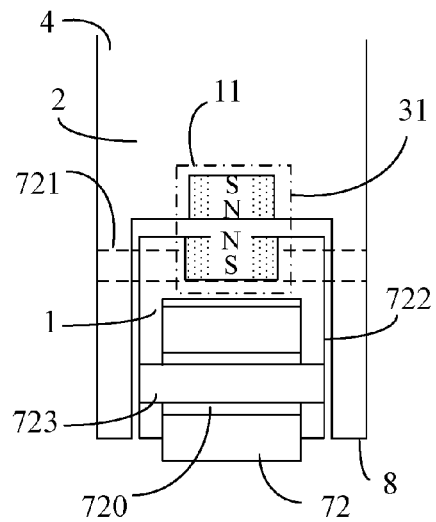
FIG. 43 is a schematic cross-sectional view of the structure of FIG. 42 taken along Line A-A.

FIG. 43 is a schematic cross-sectional view of the structure of FIG. 42 taken along Line A-A.

As shown in FIGS. 42 and 43, it primarily comprises the following components:

the first force-receiving structure (1): being constructed from a structure that is capable of swinging against the pin (721) in the inner space of the second force-receiving structure (2), a pre-stressed structure (3) constructed from a magnetic pre-stressed device (31) being provided between one end of the first force-receiving structure (1) and the limiting structure (11) extended from and linked to the second force-receiving structure (2), and a wheel arm (722) on which a shaft (723), a bearing (720) and a rolling wheel (72) are installed being provided at an opposite end of the first force-receiving structure (1);

the second force-receiving structure (2): being constructed from materials and structures having sufficient strength and supporting capability, having one end thereof combined with the carrying end (4), and having an opposite end thereof provided with a contact structure (8) having higher friction damping, and a pre-stressed structure (3) constructed from a magnetic pre-stressed device (31) being provided between the limiting structure (11) extended from and linked to the second force-receiving structure (2) and the first force-receiving structure (1) having a rolling wheel (72); and the magnetic pre-stressed device (31): including permanent magnets that are such arranged between the limiting structure (11) extended from and linked to the second force-receiving structure (2) and the first force-receiving structure (1) that they face each other with the same polarity so as to have mutual repellence.

Figure 44:
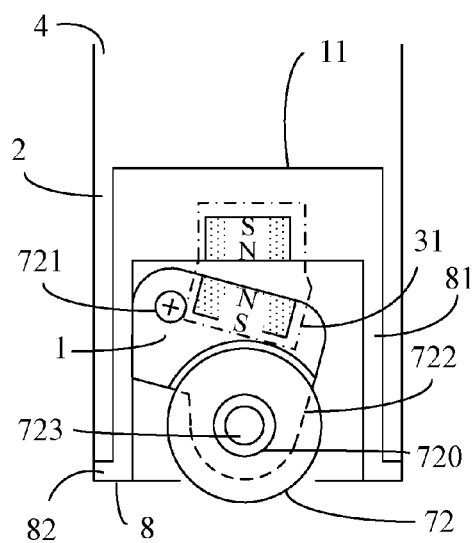
FIG. 44 schematically shows one embodiment of the assembled structure of FIG. 42.

The structure disclosed by FIG. 42 except for being constructed by combining the foregoing individual parts, it may alternatively being constructed by combining the first force-receiving structure (1), the pre-stressed structure (3), and the assembled auxiliary (81) for the second force-receiving structure first, and then combining the resulting assembly with the second force-receiving structure (2);

FIG. 44 schematically shows one embodiment of the assembled structure of FIG. 42.

As shown in FIG. 44, it primarily comprises the following components:

the first force-receiving structure (1): being installed in an inner space of the assembled auxiliary (81) for the second force-receiving structure and capable of swinging against the pin (721) in the inner space of the assembled auxiliary (81) for the second force-receiving structure, the first force-receiving structure (1) having one end thereof provided with a wheel arm (722) for the installation of a shaft (723) and a bearing (720) and facing the terminal support body (5), and a pre-stressed structure (3) being provided between an opposite end of the first force-receiving structure (1) and the limiting structure (11) at the top of the inner space of the assembled auxiliary (81) for the second force-receiving structure, wherein the pre-stressed structure (3) is constructed from a magnetic pre-stressed device (31) in which permanent magnets face each other with the same polarity so as to have mutual repellence;

the second force-receiving structure (2): being constructed from materials and structures having sufficient strength and supporting capability, having one end thereof combined with the carrying end (4), and having an opposite end thereof combined with the assembled auxiliary (81) for the second force-receiving structure;

the assembled auxiliary (81) for the second force-receiving structure: being installed in an inner space at one end of the second force-receiving structure (2) close to the terminal support body (5), the assembled auxiliary (81) for the second force-receiving structure having its structural end facing the terminal support body (5) provided with a flange (82), the flange (82) having its end facing the terminal support body (5) provided with a contact structure (8) having higher friction damping, the first force-receiving structure (1) swinging in the inner space of the assembled auxiliary (81) for the second force-receiving structure against the pin (721), a pre-stressed structure (3) constructed from a magnetic pre-stressed device (31) being provided between the assembled auxiliary (81) for the second force-receiving structure and the first force-receiving structure (1); wherein the foregoing assembled auxiliary (81) for the second force-receiving structure and the second force-receiving structure (2) may be combined in one or more ways of:

1) the two being combined by means of press-fit insertion;
2) the two being combined by means of mating spiral structures;
3) the two being fastened by laterally passing through pins;
4) the two being fastened by laterally installed screws;
5) the two being welded together; and
6) the two being bonded together; and the magnetic pre-stressed device (31): including permanent magnets that are such arranged between the limiting structure (11) at the top of the inner space of the assembled auxiliary (81) for the second force-receiving structure and one end of the first force-receiving structure (1) that they face each other with the same polarity so as to have mutual repellence.

Figure 45:
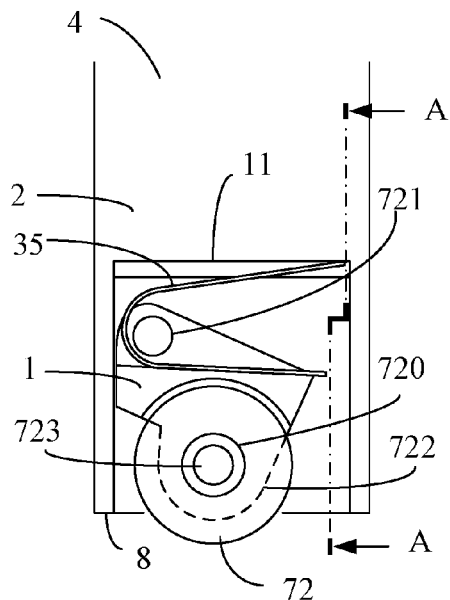
FIG. 45 schematically shows one embodiment of the present invention constructed from a U-shaped leaf spring pre-stressed device (35) and a single rolling wheel (72).

FIG. 45 schematically shows one embodiment of the present invention constructed from a U-shaped leaf spring pre-stressed device (35) and a single rolling wheel (72).

Figure 46:
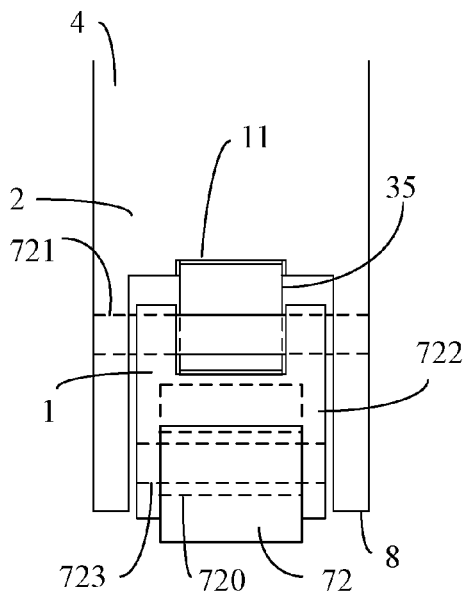
FIG. 46 is a schematic cross-sectional view of the structure of FIG. 45 taken along Line A-A.

FIG. 46 is a schematic cross-sectional view of the structure of FIG. 45 taken along Line A-A.

As shown in FIGS. 45 and 46, it primarily comprises the following components:

the first force-receiving structure (1): being constructed from a structure that is capable of swinging against the pin (721) in the inner space of the second force-receiving structure (2), a pre-stressed structure (3) constructed from a U-shaped leaf spring pre-stressed device (35) being provided between one end of the first force-receiving structure (1) and the limiting structure (11) extended from and linked to the second force-receiving structure (2), and an opposite end of the first force-receiving structure (1) having a wheel arm (722) on which a shaft (723), a bearing (720) and a rolling wheel (72) are installed;

the second force-receiving structure (2): being constructed from materials and structures having sufficient strength and supporting capability, having one end thereof combined with the carrying end (4), and having an opposite end thereof provided with a contact structure (8) having higher friction damping, and a pre-stressed structure (3) constructed from a U-shaped leaf spring pre-stressed device (35) being provided between the limiting structure (11) extended from and linked to the second force-receiving structure (2) and the first force-receiving structure (1) having a rolling wheel (72); and the U-shaped leaf spring pre-stressed device (35): being constructed from a spring plate in a U-like shape, and installed between the limiting structure (11) extended from and linked to the second force-receiving structure (2) and the first force-receiving structure (1) having the rolling wheel (72), wherein the tension generated when the U-shaped spring plate is compressed allows it to function as a pre-stressed structure (3).

Figure 47:
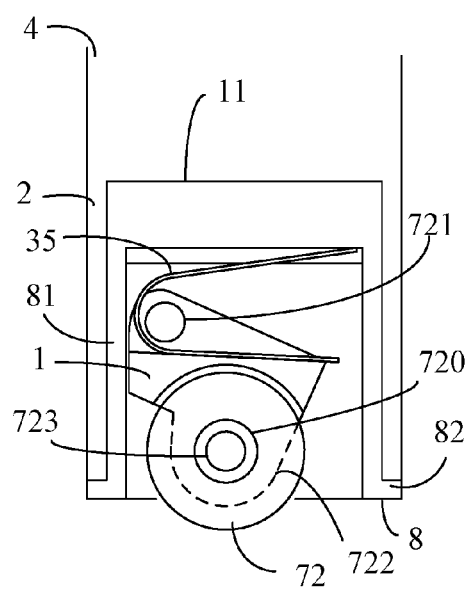
FIG. 47 schematically shows an embodiment of the assembled structure of FIG. 45.

The structure disclosed by FIG. 45 except for being constructed by combining the foregoing individual parts, it may alternatively be constructed by combining the first force-receiving structure (1), the pre-stressed structure (3), and the assembled auxiliary (81) for the second force-receiving structure first, and then combining the resulting assembly with the second force-receiving structure (2);

FIG. 47 schematically shows an embodiment of the assembled structure of FIG. 45.

As shown in FIG. 47, it primarily comprises the following components:

the first force-receiving structure (1): being installed in an inner space of the assembled auxiliary (81) for the second force-receiving structure and capable of swinging against the pin (721) in the inner space of the assembled auxiliary (81) for the second force-receiving structure, the first force-receiving structure (1) having one end thereof provided with a wheel arm (722) for the installation of a shaft (723) and a bearing (720) and facing the terminal support body (5), and a pre-stressed structure (3) being provided between an opposite end of the first force-receiving structure (1) and the limiting structure (11) at the top of the inner space of the assembled auxiliary (81) for the second force-receiving structure, wherein the pre-stressed structure (3) is constructed from a U-shaped leaf spring pre-stressed device (35) in which permanent magnets face each other with the same polarity so as to have mutual repellence;

the second force-receiving structure (2): being constructed from materials and structures having sufficient strength and supporting capability, having one end thereof combined with the carrying end (4), and having an opposite end thereof combined with the assembled auxiliary (81) for the second force-receiving structure;

the assembled auxiliary (81) for the second force-receiving structure: being installed in an inner space at one end of the second force-receiving structure (2) close to the terminal support body (5), the assembled auxiliary (81) for the second force-receiving structure having its structural end facing the terminal support body (5) provided with a flange (82), the flange (82) having its one end facing the terminal support body (5) provided with a contact structure (8) having higher friction damping, the first force-receiving structure (1) swinging in the inner space of the assembled auxiliary (81) for the second force-receiving structure against the pin (721), and a pre-stressed structure (3) constructed from a U-shaped leaf spring pre-stressed device (35) being provided therebetween; wherein the foregoing assembled auxiliary (81) for the second force-receiving structure and the second force-receiving structure (2) may be combined in one or more ways of:

1) the two being combined by means of press-fit insertion;
2) the two being combined by means of mating spiral structures;
3) the two being fastened by laterally passing through pins;
4) the two being fastened by laterally installed screws;
5) the two being welded together; and
6) the two being bonded together; and the U-shaped leaf spring pre-stressed device (35): being constructed from a spring plate in a U-like shape, and installed between a limiting structure (11) at the top of the inner space of the assembled auxiliary (81) for the second force-receiving structure and the first force-receiving structure (1) having the rolling wheel (72), wherein the tension generated when the U-shaped spring plate is compressed allows it to function as a pre-stressed structure (3).

FIG. 48 schematically shows one embodiment of the present invention constructed from a spiral spring pre-stressed device (33) and a single rolling wheel (72).

FIG. 49 is a bottom view according to FIG. 48.

As shown in FIGS. 48 and 49, it primarily comprises the following components:

the first force-receiving structure (1): being constructed from a structure that is capable of shifting along the inner space of the second force-receiving structure (2), a guide rod (111) being provided between one end of the first force-receiving structure (1) and the limiting structure (11) extended from and linked to the second force-receiving structure (2), and combined with the top of the first force-receiving structure (1) so as to perform displacement in the guide hole (112) formed in the second force-receiving structure (2), and a pre-stressed structure (3) constructed from a spiral spring pre-stressed device (33) being provided between the limiting structure (11) and a stepped structure (113) at the lower part of the first force-receiving structure (1), a rolling wheel (72) being provided at an opposite end of the first force-receiving structure (1) facing the terminal support body (5), and a bearing (720) being provided between the rolling wheel (72) and the shaft (723);

the second force-receiving structure (2): being constructed from materials and structures having sufficient strength and supporting capability, having one end thereof combined with the carrying end (4), and having an opposite end thereof provided with a contact structure (8) having higher friction damping, and a pre-stressed structure (3) constructed from a spiral spring pre-stressed device (33) being provided between the limiting structure (11) extended from and linked to the second force-receiving structure (2) and the stepped structure (113) of the first force-receiving structure (1); wherein guide slots (732) are formed at two sides of the second force-receiving structure (2) for guiding the shaft (723) to stably perform vertical displacement; and the spiral spring pre-stressed device (33): being constructed from a coil-shaped spiral spring, and installed between the limiting structure (11) extended from and linked to the second force-receiving structure (2) and the stepped structure (113) of the first force-receiving structure (1), wherein the tension generated when the spiral spring is compressed allows it to function as a pre-stressed structure (3);

An axial displacement limiting structure is provided between the first force-receiving structure (1) and the second force-receiving structure (2) for preventing the first force-receiving structure (1) from departing from the second force-receiving structure (2), in the present embodiment, the limiting function is realized by a shaft (723) provided on the first force-receiving structure (1) passing through a guide slot (732) of the second force-receiving structure (2); the foregoing axial displacement limiting structure constructed from the shaft (723) and the guide slot (732), however, is merely one example and may be realized by alternative structures that have the same limiting capability.

The structure disclosed by FIG. 48 except for being constructed by combining the foregoing individual parts, it may alternatively be constructed by combining the first force-receiving structure (1), the pre-stressed structure (3), and the assembled auxiliary (81) for the second force-receiving structure first, and then combining the resulting assembly with the second force-receiving structure (2);

FIG. 50 schematically shows one embodiment of the assembled structure of FIG. 48.

As shown in FIG. 50, it primarily comprises the following components:

the first force-receiving structure (1): being installed in an inner space of the assembled auxiliary (81) for the second force-receiving structure, and capable of shifting in the inner space of the assembled auxiliary (81) for the second force-receiving structure, the first force-receiving structure (1) having its end provided with the rolling wheel (72) facing the terminal support body (5), a guide rod (111) being provided between the opposite end of the first force-receiving structure (1) and the limiting structure (11) at the top of the inner space of the assembled auxiliary (81) for the second force-receiving structure and combined with the top of the first force-receiving structure (1) so that it performs displacement in the guide hole (112) formed in the second force-receiving structure (2), and a spiral spring pre-stressed device (33) being provided between the stepped structure (113) of the first force-receiving structure (1) and the limiting structure (11) at top of the inner space of the assembled auxiliary (81) for the second force-receiving structure, wherein the tension generated when the spiral spring is compressed allows it to function as a pre-stressed structure (3);

the second force-receiving structure (2): being constructed from materials and structures having sufficient strength and supporting capability, having one end thereof combined with the carrying end (4), and having an opposite end thereof combined with the assembled auxiliary (81) for the second force-receiving structure;

the assembled auxiliary (81) for the second force-receiving structure: being installed in an inner space of the second force-receiving structure (2) at its one end close to the terminal support body (5), the assembled auxiliary (81) for the second force-receiving structure having its structural end facing the terminal support body (5) provided with a flange (82), the flange (82) having its end facing the terminal support body (5) provided with a contact structure (8) having higher friction damping, the first force-receiving structure (1) being installed in the inner space of the assembled auxiliary (81) for the second force-receiving structure, and a pre-stressed structure (3) constructed from a spiral spring pre-stressed device (33) being provided between the limiting structure (11) at an upper end of the inner space of the second force-receiving structure (2) and the stepped structure (113) of the first force-receiving structure (1); wherein the foregoing assembled auxiliary (81) for the second force-receiving structure and the second force-receiving structure (2) may be combined in one or more ways of:

1) the two being combined by means of press-fit insertion;
2) the two being combined by means of mating spiral structures;
3) the two being fastened by laterally passing through pins;
4) the two being fastened by laterally installed screws;
5) the two being welded together; and
6) the two being bonded together; and the spiral spring pre-stressed device (33): being constructed from a coil-shaped spiral spring, and installed between a limiting structure (11) at the top of the inner space of the assembled auxiliary (81) for the second force-receiving structure and the first force-receiving structure (1).

An axial displacement limiting structure is provided between the first force-receiving structure (1) and the flange (82) of the assembled auxiliary (81) for the second force-receiving structure for preventing the first force-receiving structure (1) from departing from the assembled auxiliary (81) for the second force-receiving structure; in the present embodiment, the limiting function is realized by a guide slot (732) passing through the second force-receiving structure (2) and a shaft (723) of the assembled auxiliary (81) for the second force-receiving structure, and the foregoing axial displacement limiting structure constructed from the shaft (723) and the guide slot (732), however, is merely one example and may be realized by alternative structures that have the same limiting capability.

Figure 51:
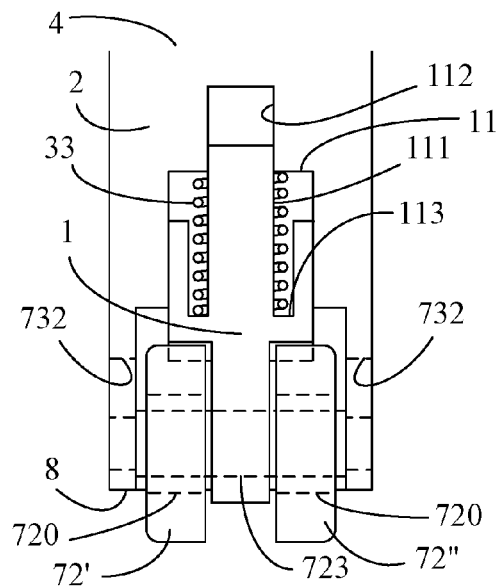
FIG. 51 schematically shows one embodiment of the present invention constructed from a spiral spring pre-stressed device (33) and two rolling wheels (72'), (72").

FIG. 51 schematically shows one embodiment of the present invention constructed from a spiral spring pre-stressed device (33) and two rolling wheels (72'), (72").

Figure 52:
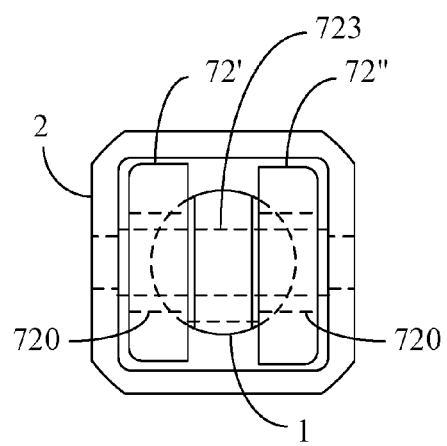
FIG. 52 is a bottom view according to FIG. 51.

FIG. 52 is a bottom view according to FIG. 51.

As shown in FIGS. 51 and 52, it primarily comprises the following components:

the first force-receiving structure (1): being constructed from a structure that is capable of shifting in the inner space of the second force-receiving structure (2), a guide rod (111) being provided between one end of the first force-receiving structure (1) and the limiting structure (11) extended from and linked to the second force-receiving structure (2) and combined with the top of the first force-receiving structure (1) so as to perform displacement in the guide hole (112) formed in the second force-receiving structure (2), and a pre-stressed structure (3) constructed from a spiral spring pre-stressed device (33) being provided between the limiting structure (11) and the stepped structure (113) at the lower part of the first force-receiving structure (1), the second force-receiving structure (2) at its opposite end facing the terminal support body (5) being provided with a shaft (723) passing through the first force-receiving structure (1), two rolling wheels (72'), (72") being provide at two sides of the shaft (723), and a bearing (720) being provided between the rolling wheels (72'), (72") and shaft (723);

the second force-receiving structure (2): being constructed from materials and structures having sufficient strength and supporting capability, having one end thereof combined with the carrying end (4), and having an opposite end thereof provided with a contact structure (8) having higher friction damping, and a pre-stressed structure (3) constructed from a spiral spring pre-stressed device (33) being provided between the limiting structure (11) extended from and linked to the second force-receiving structure (2) and the stepped structure (113) of the first force-receiving structure (1); wherein guide slots (732) are formed at two sides of the second force-receiving structure (2) for guiding the shaft (723) to stably perform vertical displacement; and the spiral spring pre-stressed device (33): being constructed from a coil-shaped spiral spring, and installed between the limiting structure (11) extended from and linked to the second force-receiving structure (2) and the stepped structure (113) of the first force-receiving structure (1), wherein the tension generated when the spiral spring is compressed allows it to function as a pre-stressed structure (3);

An axial displacement limiting structure is provided between the first force-receiving structure (1) and the second force-receiving structure (2) for preventing the first force-receiving structure (1) from departing from the second force-receiving structure (2), in the present embodiment, the limiting function is realized by a shaft (723) of the first force-receiving structure (1) passing through a guide slot (732) of the second force-receiving structure (2), and the foregoing displacement limiting structure constructed from the shaft (723) and the guide slot (732), however, is merely one example and may be realized by alternative structures that have the same limiting capability.

The structure disclosed by FIG. 51 except for being constructed by combining the foregoing individual parts, it may alternatively be constructed by combining the first force-receiving structure (1), the pre-stressed structure (3), and the assembled auxiliary (81) for the second force-receiving structure first, and then combining the resulting assembly with the second force-receiving structure (2).

Figure 53:
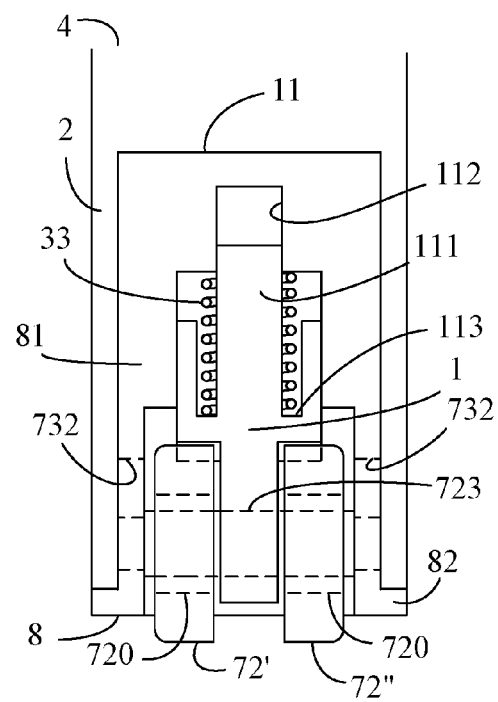
FIG. 53 schematically shows one embodiment of the assembled structure of FIG. 51.

FIG. 53 schematically shows one embodiment of the assembled structure of FIG. 51.

As shown in FIG. 53, it primarily comprises the following components:
the first force-receiving structure (1): being installed in an inner space of the assembled auxiliary (81) for the second force-receiving structure, and capable of shifting in the inner space of the assembled auxiliary (81) for the second force-receiving structure, the first force-receiving structure (1) having its one end provided with rolling wheels (72'), (72") facing the terminal support body (5), a guide rod (111) being provided between an opposite end of the first force-receiving structure (1) and the limiting structure (11) at the top of the inner space of the assembled auxiliary (81) for the second force-receiving structure and combined with the top of the first force-receiving structure (1) so as to perform displacement in the guide hole (112) formed in the second force-receiving structure (2), and a spiral spring pre-stressed device (33) being provided between the stepped structure (113) of the first force-receiving structure (1) and the limiting structure (11) at the top of the inner space of the assembled auxiliary (81) for the second force-receiving structure, wherein the tension generated when the spiral spring is compressed allows it to function as a pre-stressed structure (3);
the second force-receiving structure (2): being constructed from materials and structures having sufficient strength and supporting capability, having one end thereof combined with the carrying end (4), and having an opposite end thereof combined with the assembled auxiliary (81) for the second force-receiving structure;
the assembled auxiliary (81) for the second force-receiving structure: being installed in an inner space of the second force-receiving structure (2) at its one end close to the terminal support body (5), the assembled auxiliary (81) for the second force-receiving structure having its structural end facing the terminal support body (5) provided with a flange (82), the flange (82) having its end facing the terminal support body (5) provided with a contact structure (8) having higher friction damping, the first force-receiving structure (1) being installed in the inner space of the assembled auxiliary (81) for the second force-receiving structure, and a pre-stressed structure (3) constructed from a spiral spring pre-stressed device (33) being provided between the limiting structure (11) at an upper end of the inner space of the second force-receiving structure (2) and the stepped structure (113) of the first force-receiving structure (1); wherein the foregoing assembled auxiliary (81) for the second force-receiving structure and the second force-receiving structure (2) may be combined in one or more ways of:

1) the two being combined by means of press-fit insertion;
2) the two being combined by means of mating spiral structures;
3) the two being fastened by laterally passing through pins;
4) the two being fastened by laterally installed screws;
5) the two being welded together; and
6) the two being bonded together; and the spiral spring pre-stressed device (33): being constructed from a coil-shaped spiral spring, and installed between a limiting structure (11) at the top of the inner space of the assembled auxiliary (81) for the second force-receiving structure and the first force-receiving structure (1);

An axial displacement limiting structure is provided between the first force-receiving structure (1) and the flange (82) of the assembled auxiliary (81) for the second force-receiving structure for preventing the first force-receiving structure (1) from departing from the assembled auxiliary (81) for the second force-receiving structure, in the present embodiment, the limiting function is realized by a guide slot (732) passing through the second force-receiving structure (2) and a shaft (723) of the assembled auxiliary (81) for the second force-receiving structure, and the foregoing axial displacement limiting structure constructed from the shaft (723) and the guide slot (732) is, however, merely one example and may be realized by alternative structures that have the same limiting capability.

In the carrier device capable of varying contact damping with pressured displacement of the present application, the pre-stressed structure (3) that generates displacement corresponding to the pressure it receives in addition to the foregoing structures providing pressured displacement using energy stored as compressive prestress, it may have structures providing pressured displacement using energy stored as expansive prestress, such as those described in the embodiments below.

FIG. 54 is the first schematic structural embodiment of the present invention showing the pre-stressed structure (3) providing pressured displacement using energy stored as expansive prestress.

As shown in FIG. 54, the magnetic pre-stressed device (31) made of the permanent magnets that are arranged to have mutual repellence mutual as shown in FIG. 5 is replaced with a structure wherein the permanent magnet (311) connected to the terminal block (71) having lower friction damping through the guide rod (111) work with the magnetic conductive member (312) provided at the second force-receiving structure (2) to generate mutual attraction, which pushes the terminal block (71) having lower friction damping to be exposed outside the contact structure (8) having higher friction damping of the second force-receiving structure (2), and wherein when the terminal block (71) having lower friction damping is pressed and performs retracting displacement, the magnetic attraction between the permanent magnet (311) and the magnetic conductive member (312) is stored for providing a required pre-stressed force for the terminal block (71) having lower friction damping to return.

FIG. 55 is the second schematic structural embodiment of the present invention showing the pre-stressed structure (3) providing pressured displacement using energy stored as expansive prestress.

As shown in FIG. 55, the spiral spring pre-stressed device (33) of FIG. 23 has one end thereof received in the spring positioning hole (115) at the upper end of the guide rod (111), and has an opposite end thereof sandwiched between the stepped structure (85) of the outer auxiliary (83) for second force-receiving structure and the second force-receiving structure (2), the guide rod (111) has its lower end connected to the semi-spherical terminal block (70a), and the pulling force from the spiral spring pre-stressed device (33) exposes the semi-spherical terminal block (70a) outside the contact structure (8) having higher friction damping of the second force-receiving structure (2), and when the semi-spherical terminal block (70a) is pressed and performs retracting displacement, the spiral spring pre-stressed device (33) is in a pre-stressed state storing required energy for the semi-spherical terminal block (70a) to return.

FIG. 56 is the third schematic structural embodiment of the present invention showing the pre-stressed structure (3) providing pressured displacement using energy stored as expansive prestress.

As shown in FIG. 56, the spiral spring pre-stressed device (33) of FIG. 27 is installed inside the upper part of the terminal block (71) having lower friction damping, the upper end of the spiral spring pre-stressed device (33) is fixed to the upper part of the terminal block (71) having lower friction damping by means of the pin (724), the lower end of the spiral spring pre-stressed device (33) passes through the guide slot (731) of the terminal block (71) having lower friction damping and the second force-receiving structure (2) by means of another pin (721), the pulling force of the spiral spring pre-stressed device (33) exposes the terminal block (71) having lower friction damping outside the contact structure (8) having higher friction damping of the second force-receiving structure (2), and when the terminal block (71) having lower friction damping is pressed and performs retracting displacement, the spiral spring pre-stressed device (33) is in a pre-stressed state storing required energy for the terminal block (71) having lower friction damping to return.

FIG. 57 is the fourth schematic structural embodiment of the present invention showing the pre-stressed structure (3) providing pressured displacement using energy stored as expansive prestress.

As shown in FIG. 57, the U-shaped leaf spring (34) of FIG. 36 is replaced with a leaf spring that has preloading capability, the leaf spring fastening side (362) is sandwiched between the outer auxiliary (83) for second force-receiving structure and the combining stepped segment of the second force-receiving structure (2), the leaf spring preloaded sheet (361) applies prestress to the rolling ball (73) so as to expose the rolling ball (73) outside the contact structure (8) having higher friction damping of the outer auxiliary (83) for second force-receiving structure, and when the rolling ball (73) is pressed and performs retracting displacement, the leaf spring preloaded sheet (361) is in a pre-stressed state storing required energy for the rolling ball (73) to return.

FIG. 58 is the fifth schematic structural embodiment of the present invention showing the pre-stressed structure (3) providing pressured displacement using energy stored as expansive prestress.

As shown in FIG. 58, the magnetic pre-stressed device (31) of FIG. 42 is replaced with a permanent magnet (311) and a magnetic conductive member (312), the magnetic conductive member (312) is installed inside the second force-receiving structure (2), and the permanent magnet (311) is installed at one side of the wheel arm (722) facing the magnetic conductive member (312), so as to provide magnetic attraction that drives the wheel arm (722) to swing and in turn expose the rolling wheel (72) outside the contact structure (8) having higher friction damping of the second force-receiving structure (2), and when the rolling wheel (72) is pressed and performs retracting displacement, the magnetic attraction between the permanent magnet (311) and the magnetic conductive member (312) is in a pre-stressed state storing required energy for the rolling wheel (72) to return.

FIG. 59 is the sixth schematic structural embodiment of the present invention showing the pre-stressed structure (3) providing pressured displacement using energy stored as expansive prestress.

As shown in FIG. 59, the U-shaped leaf spring pre-stressed device (35) of the FIG. 45 is replaced with the preloaded spring (37), the preloaded spring (37) has its one end attached to and positioned on the second force-receiving structure (2), and has its opposite end being pressured by the wheel arm (722) that swings against the pin (721), so as to expose the rolling wheel (72) outside the contact structure (8) having higher friction damping of the second force-receiving structure (2), and when the rolling wheel (72) is pressed and performs retracting displacement, the preloaded spring (37) is in a pre-stressed state storing required energy for the rolling wheel (72) to return.

FIG. 60 is the seventh schematic structural embodiment of the present invention showing the pre-stressed structure (3) providing pressured displacement using energy stored as expansive prestress.

As shown in FIG. 60, a structural block (333) is installed in the second force-receiving structure (2) of the structure shown in FIG. 48, the structural block (333) allows the guide rod (111) to pass therethrough and perform axial displacement therein, the spiral spring pre-stressed device (33) has its one end received in the spring positioning hole (115) at the upper end of the guide rod (111), the spiral spring pre-stressed device (33) has its opposite end received in the spring positioning hole (116) of the structural block (333), the spiral spring pre-stressed device (33) exerts a pulling force on the spring positioning hole (115) at the upper end of the guide rod (111) so as to expose the rolling wheel (72) outside the contact structure (8) having higher friction damping of the second force-receiving structure (2), and when the rolling wheel (72) is pressed and performs retracting displacement, the spiral spring pre-stressed device (33) is in a pre-stressed state storing required energy for the rolling wheel (72) to return.

In the practical uses, the carrier device capable of varying contact damping with pressured displacement of the present invention maybe combined with traditional interface mechanisms for enriched applications or for lengthened service life. A relevant example is discussed below.

FIG. 61 schematically shows an embodiment that the present invention is provided with the axial rotating structure (21).

As shown in FIG. 61, with the shaft post (211) and the bearing (212) provided on the second force-receiving structure (2) of the carrier device assembly (1000) capable of varying contact damping with pressured displacement, rotation between the carrying end (4) and the carrier device assembly (1000) capable of varying contact damping with pressured displacement is achieved;

The structure primarily includes the following components:

the carrier device assembly (1000) capable of varying contact damping with pressured displacement: being a structure constructed according to the principles as shown in FIG. 1 through FIG. 4 (at least including the embodiments of FIG. 5 through FIG. 60), wherein the pressure line (S2) of the first force-receiving structure (1) and the terminal support body (5) does not coincide with the revolving axial line (S1) on which the carrier device assembly (1000) capable of varying contact damping with pressured displacement and the carrying end (4) revolve, so that the pressure line (S2) of the first force-receiving structure (1) and the terminal support body (5) can revolve against the revolving axial line (S1) at the carrying end.

The axial rotating structure (21) is constructed from:

shaft post (211): being a shaft post structure extending from the second force-receiving structure (2) of the carrier device assembly (1000) capable of varying contact damping with pressured displacement toward the carrying end (4), for enabling the hole seat (216) combined with the carrying end (4) to revolve, a bearing (212) being provided therebetween, and an axial positioning annular slot (213) being provided at the shaft post (211), wherein the positioning ball (214) provided at the lateral screw hole (217) of the hole seat (216) of the carrying end (4) and the positioning bolt (215) prevents the shaft post (211) from leaving the hole seat (216).

With the foregoing structure, axial rolling between the carrier device capable of varying contact damping with pressured displacement and the carrying end (4) can be achieved.

In addition, the carrier device capable of varying contact damping with pressured displacement of the present invention may form a sealing function through the combination of a conventional sealing ring (91) and an annular sealing slot (92) between the first force-receiving structure (1) and the second force-receiving structure (2), between the first force-receiving structure (1) and the assembled auxiliary (81) for the second force-receiving structure, or between the semi-spherical terminal block (70a)/annular flange structure (70b)/semi-spherical cup-shaped structure (70c)/outwardly-extended annular sheet (70d)/terminal block (71) having lower friction damping and the second force-receiving structure (2), thereby lengthening its service life.

The invention claimed is:

1. A carrier device for providing friction damping and having a carrying end (4) for bearing a load or stress and a first contact structure (7) opposite the carrying end (4) for contacting a terminal support body (5), comprising:

a first force-receiving structure (1) that includes said first contact structure (7) that provides a first friction damping when in contact with the terminal support body (5);

a second force-receiving structure (2) displaceable with a second contact structure (8) that provides a second friction damping when in contact with the terminal support body (5), the first friction damping provided by the first contact structure (7) being lower than the second friction damping provided by the second contact structure (8);

a limiting structure (11) linked to the second force-receiving structure (2);

a pre-stressed structure (3) provided between the limiting structure (11) and the first force-receiving structure (1), wherein:

when a pressure resulting from the load or stress on the carrying end (4) is less than a preset value is applied to the carrying end (4), the pre-stressed structure (3) prevents transmission of the lower pressure to the limiting structure (11) and responsive displacement of the second force-receiving structure (2), so that only the first contact structure (7) contacts the terminal support body (5) to provide said first lower friction damping, and when the pressure resulting from the load or stress on the carrying end (4) is greater than the preset value is applied to the carrying end (4), the greater pressure is transmitted by the pre-stressed structure (3) to cause transmission of the higher pressure to the limiting structure (11) and responsive displacement of the second force-receiving structure (2), thereby causing the second contact structure (8) to contact the terminal support body (5) and provide said second higher friction damping.

2. A carrier device as claimed in claim 1, wherein the first contact structure (7) having the first lower friction damping is one of a terminal block (71) having a low coefficient of sliding friction, a rolling wheel (72), and a rolling ball (73).

3. A carrier device as claimed in claim 1, wherein the pre-stressed structure (3) includes at least one of a spring device, a pneumatic device, a hydraulic device incorporating pneumatic elements, and a magnetic device.

4. A carrier device as claimed in claim 1, wherein load or stress on the carrying end (4) is a sum of a weight of the carrier device and a load (6) applied to the carrier end (4) and/or a pressure applied to the carrier end (4).

5. A carrier device as claimed in claim 1, wherein:

the pre-stressed structure (3) is a magnetic device (31) and the first contact structure (7) is provided on a terminal block (71) movably positioned within an inner space of the second force-receiving structure (2), the magnetic device (31) includes first and second magnets respectively connected to the force limiting structure (11) and the terminal block (71), said first and second magnets having same polarities to provide mutual magnetic repulsion, and movement of the terminal block (71) within the inner space of the second force-receiving structure (2) is limited by a coupled axial displacement limiting structure of the terminal block (71) and the second force-receiving structure (2).

6. A carrier device as claimed in claim 5, wherein the coupled axial displacement limiting structure includes a guide slot (731) in the first force-receiving structure (1) and a pin (721) extending from the second force-receiving structure (2) into the guide slot (731).

7. A carrier device as claimed in claim 5, wherein the first contact structure (7) having the first lower friction damping is a surface of the terminal block (71) having a low coefficient of sliding friction.

8. A carrier device as claimed in claim 7, wherein the first contact structure (7) is a rolling wheel (72) mounted to the first force-receiving structure (1) by a shaft (723) and a bearing (720).

9. A carrier device as claimed in claim 7, wherein the first contact structure (7) is a rolling ball (73) captured by a ring (730) installed in an inner side of a lower opening in the second force-receiving structure (2).

10. A carrier device as claimed in claim 9, further comprising an intermediate abrasion-reducing pad (735) provided between the magnetic device (31) and the rolling ball (73).

11. A carrier device as claimed in claim 1, wherein the pre-stressed structure (3) and first force-receiving structure (1) are assembled to an auxiliary structure (81) having a flange (82) that extends under a base of the second force-receiving structure (2) and that includes the second contract structure (8), wherein the carrying end (4) is situated at a top end of the second force-receiving structure (2), the limiting structure (11) is at a top end of the auxiliary structure (81), and the limiting structure (11) is in contact with the second force-receiving structure (2), wherein the pre-stressed structure (3) resists displacement of the limiting structure (11), auxiliary structure (81), and second force-receiving structure (2) when the load or stress on the carrying end (4) is less than the preset value and permits the displacement of the limiting structure (11), auxiliary structure (81), and second force-receiving structure (2) when the load or stress on the carrying end (4) exceeds the preset value.

12. A carrier device as claimed in claim 11, wherein the auxiliary structure (81) is assembled to the second force-receiving structure (2) by at least one of the following:
by the auxiliary structure (81) being press-fit into the second force-receiving structure (2),
by combining mating spiral structures on the auxiliary structure (81) and the second force-receiving structure (2),
by a pin that passes laterally through the auxiliary structure (81) and the second force-receiving structure (2),
by at least one screw,
by welds, and
by being bonded together.

13. A carrier device as claimed in claim 11, wherein:
the pre-stressed structure (3) is a magnetic device (31) and the first contact structure (7) is provided on a terminal block (71) movably positioned within an inner space of the auxiliary structure (81),
the magnetic device (31) includes first and second magnets respectively connected to the force limiting structure (11) and the terminal block (71), said first and second magnets having same polarities to provide mutual magnetic repulsion, and
movement of the terminal block (71) within the inner space of the auxiliary structure (81) is limited by a coupled axial displacement limiting structure of the terminal block (71) and the auxiliary structure (81).

14. A carrier device as claimed in claim 13, wherein the coupled axial displacement limiting structure includes a guide slot (731) in the first force-receiving structure (1) and a pin (721) extending from the second force-receiving structure (2) into the guide slot (731).

15. A carrier device as claimed in claim 14, wherein the first contact structure (7) having the first lower friction damping is a surface of the terminal block (71) having a low coefficient of sliding friction.

16. A carrier device as claimed in claim 14, wherein the first contact structure (7) is a rolling wheel (72) mounted to the first force-receiving structure (1) by a shaft (723) and a bearing (720).

17. A carrier device as claimed in claim 14, wherein the first contact structure (7) is a rolling ball (73) captured by a ring (730) installed in an inner side of a lower opening in the auxiliary device (81).

18. A carrier device as claimed in claim 17, further comprising an intermediate abrasion-reducing pad (735) provided between the magnetic device (31) and the rolling ball (73).

19. A carrier device as claimed in claim 1, wherein:
the second contact structure (8) includes a tubular outer auxiliary structure (83) having a first end attached to an outer periphery of the second force-receiving structure (2) and a second end that provides the second higher friction damping,
the pre-stressed structure (3) is a magnetic device (31) and the first contact structure (7) includes a semi-spherical terminal block (70a) movably positioned within an inner space of the outer auxiliary structure (83),
the magnetic device (31) includes first and second magnets respectively connected to the force limiting structure (11) and the semi-spherical terminal block (70a), and
movement of the semi-spherical terminal block (70a) within the inner space of the outer auxiliary structure (83) is limited by a coupled axial displacement limiting structure of the semi-spherical terminal block (70a) and the second force-receiving structure (2).

20. A carrier device as claimed in claim 19, wherein the coupled axial displacement limiting structure includes a flange (70b) extending outwardly from a top of the semi-spherical terminal block (70a) and a shoulder (84) extending inwardly from the outer auxiliary structure (83) to engage the flange (70b).

21. A carrier device as claimed in claim 19, wherein the semi-spherical terminal block (70a) has a semi-spherical cup-shaped structure (70c) on an exterior surface thereof.

22. A carrier device as claimed in claim 21, wherein the cup-shaped structure (70c) is bent to form an annular flange (70d), and the coupled axial displacement limiting structure includes the annular flange (70d) and a shoulder (84) extending inwardly from the outer auxiliary structure (83) to engage the annular flange (70d).

23. A carrier device as claimed in claim 1, wherein:
the pre-stressed structure (3) and first force-receiving structure (1) are assembled to an auxiliary structure (81) having a flange (82) that extends under a base of the second force-receiving structure (2) and that includes the second contract structure (8), wherein the carrying end (4) is situated at a top end of the second force-receiving structure (2), the limiting structure (11) is at a top end of the auxiliary structure (81), and the limiting structure (11) is in contact with the second force-receiving structure (2), wherein the pre-stressed structure (3) resists displacement of the limiting structure (11), auxiliary structure (81), and second force-receiving structure (2) when the load or stress on the carrying end (4) is less than the preset value and permits the displacement of the limiting structure (11), auxiliary structure (81), and second force-receiving structure (2) when the load or stress on the carrying end (4) exceeds the preset value,
the pre-stressed structure (3) is a magnetic device (31) and the first contact structure (7) is provided on a semi-spherical terminal block (70a) movably positioned within an inner space of the auxiliary structure (81),
the magnetic device (31) includes first and second magnets respectively connected to the force limiting structure (11) and the semi-spherical terminal block (70a), and
movement of the semi-spherical terminal block (70a) within the inner space of the auxiliary structure (81) is limited by a coupled axial displacement limiting structure of the semi-spherical terminal block (70a) and the auxiliary structure (81).

24. A carrier device as claimed in claim 23, wherein the coupled axial displacement limiting structure includes a flange (70b) extending outwardly from a top of the semi-spherical terminal block (70a) and a shoulder (84) extending inwardly from the auxiliary structure (81) to engage the flange (70b).

25. A carrier device as claimed in claim 1, wherein:
the second contact structure (8) includes a tubular outer auxiliary structure (83) having a first end attached to an outer periphery of the second force-receiving structure (2) and a second end that provides the second higher friction damping,
the pre-stressed structure (3) is a spring (33) extending between the force limiting structure (11) and the first force-receiving structure (1),
the first contact structure (7) includes a semi-spherical terminal block (70a) movably positioned within an inner space of the outer auxiliary structure (83), and
movement of the semi-spherical terminal block (70a) within the inner space of the outer auxiliary structure (83) is limited by a coupled axial displacement limiting structure of the semi-spherical terminal block (70a) and the second force-receiving structure (2).

26. A carrier device as claimed in claim 25, wherein the coupled axial displacement limiting structure includes a flange (70b) extending outwardly from a top of the semi-spherical terminal block (70a) and a shoulder (84) extending inwardly from the outer auxiliary structure (83) to engage the flange (70b).

27. A carrier device as claimed in claim 25, wherein the semi-spherical terminal block (70a) has a semi-spherical cup-shaped structure (70c) on an exterior surface thereof.

28. A carrier device as claimed in claim 27, wherein the cup-shaped structure (70c) is bent to form an annular flange (70d), and the coupled axial displacement limiting structure includes the annular flange (70d) and a shoulder (84) extending inwardly from the outer auxiliary structure (83) to engage the annular flange (70d).

29. A carrier device as claimed in claim 1, wherein:
the pre-stressed structure (3) and first force-receiving structure (1) are assembled to an auxiliary structure (81) having a flange (82) that extends under a base of the second force-receiving structure (2) and that includes the second contract structure (8), wherein the carrying end (4) is situated at a top of the second force-receiving structure (2), the limiting structure (11) is at a top end of the auxiliary structure (81), and the limiting structure (11) is in contact with the second force-receiving structure (2), wherein the pre-stressed structure (3) resists displacement of the limiting structure (11), auxiliary structure (81), and second force-receiving structure (2) when the load or stress on the carrying end (4) is less than the preset value and permits the displacement of the limiting structure (11), auxiliary structure (81), and second force-receiving structure (2) when the load or stress on the carrying end (4) exceeds the preset value,
the pre-stressed structure (3) is a spring (33) extending between the force limiting structure (11) and the first force-receiving structure (1),
the first contact structure (7) is provided on a semi-spherical terminal block (70a) movably positioned within an inner space of the auxiliary structure (81), and
the movement of the semi-spherical terminal block (70a) within the inner space of the auxiliary structure (81) is limited by a coupled axial displacement limiting structure of the semi-spherical terminal block (70a) and the second force-receiving structure (2).

30. A carrier device as claimed in claim 29, wherein the coupled axial displacement limiting structure includes a flange (70b) extending outwardly from a top of the semi-spherical terminal block (70a) and a shoulder (84) extending inwardly from the auxiliary structure (81) to engage the flange (70b).

31. A carrier device as claimed in claim 1, wherein:
the pre-stressed structure (3) is a spring (33) extending between the limiting structure (11) and the first force-receiving structure (1),
the first contact structure (7) is provided on a terminal block (71) movably positioned within an inner space of the second force-receiving structure (2), and
movement of the terminal block (71) within the inner space of the second force-receiving structure (2) is limited by coupled axial displacement limiting structure of the terminal block (71) and the second force-receiving structure (2).

32. A carrier device as claimed in claim 31, wherein the coupled axial displacement limiting structure includes a guide slot (731) in the first force-receiving structure (1) and a pin (721) extending from the second force-receiving structure (2) into the guide slot (731).

33. A carrier device as claimed in claim 31, wherein the first contact structure (7) having the first lower friction damping is a surface of the terminal block (71) having a low coefficient of sliding friction.

34. A carrier device as claimed in claim 1, wherein:
the pre-stressed structure (3) is a spring (33,34) extending between the limiting structure (11) and the first force-receiving structure (1), and
the first contact structure (7) is a rolling ball (73).

35. A carrier device as claimed in claim 34, wherein:
the second contact structure (8) is provided on an outer auxiliary structure (83) having a first end attached to an outer periphery of the second force-receiving structure (2) and a second end that provides the second higher friction damping,
the spring (33,34) extends between the limiting structure (11) and the rolling ball (73), and
an interior surface of the outer auxiliary structure (83) is inwardly tapered to capture the rolling ball (73).

36. A carrier device as claimed in claim 35, wherein the outer auxiliary structure (83) is threaded onto the second force-receiving structure (2).

37. A carrier device as claimed in claim 35, wherein the spring (33,34) is a coil spring (33).

38. A carrier device as claimed in claim 37, further comprising an intermediate abrasion-reducing pad (735) provided between the coil spring (33) and the rolling ball (73).

39. A carrier device as claimed in claim 35, wherein the spring (33,34) is a U-shaped leaf spring (34) with a concave contact surface for contacting the rolling ball (73).

40. A carrier device as claimed in claim 31, wherein:
the pre-stressed structure (3) and first force-receiving structure (1) are assembled to an auxiliary structure (81) having a flange (82) that extends under a base of the second force-receiving structure (2) and that includes the second contract structure (8), wherein the carrying end (4) is situated at a top end of the second force-receiving structure (2), the limiting structure (11) is at a top end of the auxiliary structure (81), and the limiting structure (11) is in contact with the second force-receiving structure (2), wherein the pre-stressed structure (3) resists displacement of the limiting structure (11), auxiliary structure (81), and second force-receiving structure (2) when the load or stress on the carrying end (4) is less than the preset value and permits the displacement of the limiting structure (11), auxiliary structure (81), and second force-receiving structure (2) when the load or stress on the carrying end (4) exceeds the preset value, the pre-stressed structure (3) is a spring (33) extending between the limiting structure (11) and the first force-receiving structure (1),
the first contact structure (7) is provided on a terminal block (71) movably positioned within an inner space of the auxiliary structure (81), and
movement of the terminal block (71) within the inner space of the auxiliary structure (81) is limited by coupled axial displacement limiting structure of the terminal block (71) and the auxiliary structure (81).

41. A carrier device as claimed in claim 1, wherein:
the pre-stressed structure (3) and first force-receiving structure (1) are assembled to an auxiliary structure (81) having a flange (82) that extends under a base of the second force-receiving structure (2) and that includes the second contract structure (8), wherein the carrying end (4) is situated at a top end of the second force-receiving structure (2), the limiting structure (11) is at a top end of the auxiliary structure (81), and the limiting structure (11) is in contact with the second force-receiving structure (2), wherein the pre-stressed structure (3) resists displacement of the limiting structure (11), auxiliary structure (81), and second force-receiving structure (2) when the load or stress on the carrying end (4) is less than the preset value and permits the displacement of the limiting structure (11), auxiliary structure (81), and second force-receiving structure (2) when the load or stress on the carrying end (4) exceeds the preset value,
the first contact structure (7) is a rolling ball (73),
the pre-stressed structure (3) is a spring (33,34) extending between the force limiting structure (11) and the rolling ball (73), and
an interior surface of the auxiliary structure (81) is inwardly tapered to capture the rolling ball (73).

42. A carrier device as claimed in claim 41, wherein second force-receiving structure (2) further includes an intermediate assembling member (810), and the auxiliary structure (81) is threaded onto the intermediate assembling member (810).

43. A carrier device as claimed in claim 41, wherein the spring (33,34) is a coil spring (33).

44. A carrier device as claimed in claim 43, further comprising an intermediate abrasion-reducing pad (735) provided between the coil spring (33) and the rolling ball (73).

45. A carrier device as claimed in claim 41, wherein the spring (33,34) is a U-shaped leaf spring (34) with a concave contact surface for contacting the rolling ball (73).

46. A carrier device as claimed in claim 1, wherein:
the pre-stressed structure (3) is an elastic member (32),
the first contact structure (7) is provided on a terminal block (71) movably positioned within an inner space of the second force-receiving structure (2), and
respective ends of the elastic member (32) are received in a first recess (331) in the limiting structure (11) and a second recess (332) in the terminal block (71).

47. A carrier device as claimed in claim 46, wherein the coupled axial displacement limiting structure includes a guide slot (731) in the first force-receiving structure (1) and a pin (721) extending from the second force-receiving structure (2) into the guide slot (731).

48. A carrier device as claimed in claim 46, wherein the first contact structure (7) having the first lower friction damping is a surface of the terminal block (71) having a low coefficient of sliding friction.

49. A carrier device as claimed in claim 46, wherein:
the elastic member (32) and the terminal block (71) are assembled to an auxiliary structure (81) having a flange (82) that extends under a base of the second force-receiving structure (2) and that includes the second contract structure (8).

50. A carrier device as claimed in claim 49, wherein the coupled axial displacement limiting structure includes a guide slot (731) in the first force-receiving structure (1) and a pin (721) extending from the second force-receiving structure (2) into the guide slot (731).

51. A carrier device as claimed in claim 49, wherein the first contact structure (7) having the first lower friction damping is a surface of the terminal block (71) having a low coefficient of sliding friction.

52. A carrier device as claimed in claim 1, wherein:
the first contact structure (7) is a rolling wheel (72) installed on a first shaft (723) via a bearing (720),
the first shaft (723) is installed on a wheel arm (722) pivotally mounted to the second force-receiving structure (2) by a second shaft (721), and
the pre-stressed structure (3) extends between or includes elements on the force limiting structure (11) and the wheel arm (722).

53. A carrier device as claimed in claim 52, wherein the pre-stressed structure (3) is a magnetic device (31) that includes first and second magnets respectively connected to the force limiting structure (11) and the wheel arm (722), said first and second magnets having same polarities to provide mutual magnetic repulsion.

54. A carrier device as claimed in claim 52, wherein the pre-stressed structure (3) is a U-shaped leaf spring (35) installed between the force limiting structure (11) and the wheel arm (722).

55. A carrier device as claimed in claim 52, wherein:
the pre-stressed structure (3), the wheel arm (722), and the roller wheel (72) are assembled to an auxiliary structure (81) having a flange (82) that extends under a base of the second force-receiving structure (2) and that includes the second contract structure (8).

56. A carrier device as claimed in claim 55, wherein the pre-stressed structure (3) is a magnetic device (31) that includes first and second magnets respectively connected to the auxiliary structure (81) and the wheel arm (722), said first and second magnets having same polarities to provide mutual magnetic repulsion.

57. A carrier device as claimed in claim 55, wherein the pre-stressed structure (3) is a U-shaped leaf spring (35) installed between the auxiliary structure (81) and the wheel arm (722).

58. A carrier device as claimed in claim 1, wherein:
the first force-receiving structure (1) includes a guide rod (111) axially displaceable in a guide hole (112) of the second force-receiving structure (2), and a stepped structure (113) to which at least one rolling wheel (72 or 72',72") is mounted via a shaft (723) and at least one bearing (720),
the shaft (723) extends into and is guided by slots (732) in the second force-receiving structure (2) on two sides of the stepped structure (113), and the pre-stressed structure (3) is a coil spring (33) extending between the second force-receiving structure (2) and the stepped structure (113) to bias the at least one rolling wheel (72 or 72',72") in a direction of engagement with the terminal support body (5).

59. A carrier device as claimed in claim 58, wherein the at least one rolling wheel includes a pair of rolling wheels (72' and 72") mounted on the shaft (723) via bearings (720).

60. A carrier device as claimed in claim 1, wherein:
the pre-stressed structure (3) and first force-receiving structure (1) are assembled to an auxiliary structure (81) having a flange (82) that extends under a base of the second force-receiving structure (2) and that includes the second contract structure (8), wherein the carrying end (4) is situated at a top end of the second force-receiving structure (2), the limiting structure (11) is at a top end of the auxiliary structure (81), and the limiting structure (11) is in contact with the second force-receiving structure (2), wherein the pre-stressed structure (3) resists displacement of the limiting structure (11), auxiliary structure (81), and second force-receiving structure (2) when the load or stress on the carrying end (4) is less than the preset value and permits the displacement of the limiting structure (11), auxiliary structure (81), and second force-receiving structure (2) when the load or stress on the carrying end (4) exceeds the preset value,
the first force-receiving structure (1) includes a guide rod (111) axially displaceable in a guide hole (112) of the auxiliary structure (81), and a stepped structure (113) to which at least one rolling wheel (72 or 72',72") is mounted via a shaft (723) and at least one bearing (720),
the shaft (723) extends into and is guided by slots (732) in the auxiliary structure (81) on two sides of the stepped structure (113), and
the pre-stressed structure (3) is a coil spring (33) extending between the auxiliary structure (81) and the stepped structure (113) to bias the at least one rolling wheel (72 or 72',72") in a direction of engagement with the terminal support body (5).

61. A carrier device as claimed in claim 60, wherein the at least one rolling wheel includes a pair of rolling wheels (72' and 72") mounted on the shaft (723) via bearings (720).

62. A carrier device as claimed in claim 1, wherein:
the first contact structure (7) is provided on a terminal block (71) movably positioned within an inner space of the second force-receiving structure (2),
the pre-stressed structure (3) includes a permanent magnet (311) and a magnetically conductive member (312) connected to the second force-receiving structure (2),
the permanent magnet (311) is connected to the terminal block (71) via a guide rod (111) that extends through the magnetically conductive member (312), and
the first contact structure (7) having the first lower friction damping is a surface of the terminal block (71) having a low coefficient of sliding friction.

63. A carrier device as claimed in claim 1, wherein:
the second contact structure (8) includes a tubular outer auxiliary structure (83) having a first end attached to an outer periphery of the second force-receiving structure (2) and a second end that provides the second higher friction damping,
the first contact structure (7) is provided on a semi-spherical terminal block (70a) movably positioned within an inner space of the outer auxiliary structure (83),
the first contact structure (7) is a first surface of the semi-spherical terminal block (70a) having a low coefficient of sliding friction to provide the first lower friction damping,
the semi-spherical terminal block (70a) has a guide rod (111) extending from a second surface opposite the first surface of the semi-spherical terminal block (70a),
the pre-stressed structure (3) includes a coil spring (33) having a first end that extends into a positioning hole (115) at one end of the guide rod (111) and a second end that engages a stepped structure (85) of the outer auxiliary structure (83).

64. A carrier device as claimed in claim 46, wherein:
the first contact structure (7) is provided on a terminal block (71) movably positioned within an inner space of the second force-receiving structure (2),
the first contact structure (7) is a first surface of the terminal block (71) having a low coefficient of sliding friction to provide the first lower friction damping, and
the pre-stressed structure (3) includes a coil spring (33) having a first end attached to a pin (724) fixed at an upper end of the terminal block (71) and a second end attached to a pin (721) affixed to the second force-receiving structure (2) and extending through guide slots (731) in the terminal block (71) to permit relative movement between the terminal block (71) and the second pin (721).

65. A carrier device as claimed in claim 1, wherein:
the second contact structure (8) is provided on an outer auxiliary structure (83) having a first end attached to an outer periphery of the second force-receiving structure (2) and a second end that provides the second higher friction damping,
the first force-receiving structure (1) is a rolling ball (73) captured by a tapered interior surface of the outer auxiliary structure (83),
the pre-stressed structure (3) is a leaf spring (361) having a fastening portion (362) sandwiched between the outer auxiliary structure (83) and a stepped section of the second force-receiving structure (2), and
when the rolling ball (73) is pressed and retracted, the leaf spring (361) provides a restoring force to return the rolling ball (73) to an unretracted position in which it engages the tapered interior surface of the outer auxiliary structure (83).

66. A carrier device as claimed in claim 1, wherein:
the first contact structure (7) is a rolling wheel (72) installed on a first shaft (723) via a bearing (720),
the first shaft (723) is installed on a wheel arm (722) pivotally mounted to the second force-receiving structure (2) by a second shaft (721), and
the pre-stressed structure (3) includes a magnetically conductive element (312) on one of the second force-receiving structure (2) and the wheel arm (722), and a permanent magnet (311) on the other of the second force-receiving structure (2) and the wheel arm (722).

67. A carrier device as claimed in claim 1, wherein:
the first contact structure (7) is a rolling wheel (72) installed on a first shaft (723) via a bearing (720),
the first shaft (723) is installed on a wheel arm (722) pivotally mounted to the second force-receiving structure (2) by a second shaft (721), and
the pre-stressed structure (3) includes a pre-loaded spring (37) that extends around the second shaft (721), a first end that presses against the second force-receiving structure (2) and a second end that presses against the wheel arm (722).

68. A carrier device as claimed in claim 1, wherein:
the first force-receiving structure (1) includes a guide rod (111) that extends through a structural block (333) fixed to the second force-receiving structure (2), and a stepped structure to which at least one rolling wheel (72) is mounted via a shaft (723) and at least one bearing (720), and
the pre-stressed structure (3) is a coil spring (33) having a first end that extends into and is secured by a positioning hole (115) in the guide rod (111) and a second end that extends through a positioning hole (116) in the structural block (333) and that is secured to the structural block (333) to bias the at least one rolling wheel (72) in a direction of engagement with the terminal support body (5).

69. A carrier device as claimed in claim 1, wherein:
the carrier is part of a carrier device assembly (1000) provided with an axial rotating structure (21) that includes a shaft post (211) extending through a hole seat (216) combined with the carrying end (4), the carrier device assembly (1000) being further provided with at least one bearing (212) provided between the second force-receiving structure (2) and the hole seat (216), and
a rotation axis (S1) of the carrier device assembly (1000) does not coincide with a central pressure line (S2) of the first force-receiving structure (1) so that contact damping varies as the carrier device assembly (1000) is rotated.

70. A carrier device as claimed in claim 69, wherein the shaft post (211) is retained in the hole seat (216) by an annular positioning slot (213) in the shaft post (211), at least one positioning ball (214) in the annular positioning slot (213), at least one screw hole (217) extending through the hole seat (216) and aligned with the positioning slot (213), and at least one set screw (215) threaded into the at least one screw hold (217).

71. A carrier device as claimed in claim 69, further comprising an annular sealing groove (92) and sealing ring (91) between the first force-receiving structure (1) and the second force-receiving structure (2).

* * * * *